US012587933B2

(12) United States Patent
Baek et al.

(10) Patent No.: US 12,587,933 B2
(45) Date of Patent: Mar. 24, 2026

(54) METHOD AND DEVICE FOR TRANSMITTING AND RECEIVING DATA IN WIRELESS COMMUNICATION SYSTEM

(71) Applicant: Samsung Electronics Co., Ltd., Suwon-si (KR)

(72) Inventors: Sangkyu Baek, Suwon-si (KR); Sangjin Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 465 days.

(21) Appl. No.: 17/928,094

(22) PCT Filed: May 21, 2021

(86) PCT No.: PCT/KR2021/095050
§ 371 (c)(1),
(2) Date: Nov. 28, 2022

(87) PCT Pub. No.: WO2021/242076
PCT Pub. Date: Dec. 2, 2021

(65) Prior Publication Data
US 2023/0217338 A1     Jul. 6, 2023

(30) Foreign Application Priority Data
May 29, 2020     (KR) ........................ 10-2020-0065081

(51) Int. Cl.
*H04W 36/30* (2009.01)
*H04W 24/08* (2009.01)

(52) U.S. Cl.
CPC ......... *H04W 36/305* (2018.08); *H04W 24/08* (2013.01)

(58) Field of Classification Search
CPC ............... H04W 36/305; H04W 24/08; H04W 36/0069; H04W 76/11; H04W 76/15;
(Continued)

(56) References Cited

U.S. PATENT DOCUMENTS

2019/0254100 A1*   8/2019   Yu ........................ H04W 76/19
2019/0356536 A1*  11/2019   Lee ..................... H04L 41/0816
(Continued)

FOREIGN PATENT DOCUMENTS

| KR | 10-2020-0043457 A | 4/2020 |
| WO | 2020/033395 A1 | 2/2020 |
| WO | 2020/091660 A1 | 5/2020 |

OTHER PUBLICATIONS

Ericsson, Updates for R16 LTE Mobility Enhancements and LTE updates for R16 NR Mobility Enhancments, R2-2004621, 3GPP TSG-RAN WG2 Meeting #109bis-e, Electronic meeting, May 21, 2020.

(Continued)

*Primary Examiner* — Steven Hieu D Nguyen
(74) *Attorney, Agent, or Firm* — Jefferson IP Law, LLP

(57) ABSTRACT

The present disclosure relates to a method and apparatus for transmitting and receiving data in a wireless communication system. An operating method of a terminal that is able to communicate with a master node and a secondary node in a wireless communication system includes detecting a master cell group (MCG) failure related to the master node, in response to the detecting of the MCG failure, changing a primary path of a split signaling radio bearer 1 (SRB1) from a radio link control (RLC) bearer of an MCG related to the master node to one RLC bearer from among a plurality of RLC bearers of a secondary cell group (SCG) related to the secondary node, based on a pre-determined criterion, and transmitting a message related to the MCG failure to the
(Continued)

START

TRIGGER MCG FAILURE — 410

SUSPEND SRB AND DRB TRANSMISSION VIA MCG EXCLUDING SRB0 — 420

RESET MCG MAC — 430

STOP TIMER (E.G., T304) THAT IS RUNNING — 440

TRIGGER MCG FAILURE REPORT OPERATION — 450

END master node, by using the RLC bearer of the SCG changed as the primary path.

10 Claims, 18 Drawing Sheets

(58) Field of Classification Search
CPC ..... H04W 76/19; H04W 76/20; H04W 24/10; H04W 76/18
See application file for complete search history.

(56) References Cited

U.S. PATENT DOCUMENTS

| | | | | |
|---|---|---|---|---|
| 2020/0059395 | A1* | 2/2020 | Chen | ................... H04W 28/082 |
| 2020/0163140 | A1* | 5/2020 | Mochizuki | ........ H04W 36/0069 |
| 2020/0169917 | A1 | 5/2020 | Tang | |
| 2020/0245393 | A1 | 7/2020 | Teyeb et al. | |
| 2020/0260347 | A1* | 8/2020 | Xu | ......................... H04W 88/06 |
| 2020/0267794 | A1 | 8/2020 | Baek et al. | |
| 2020/0305213 | A1* | 9/2020 | Teyeb | .................. H04W 72/23 |
| 2021/0153218 | A1* | 5/2021 | Wang | ................. H04W 72/543 |
| 2021/0168689 | A1* | 6/2021 | Shimoda | .............. H04W 76/30 |
| 2022/0007214 | A1* | 1/2022 | Zhang | ................. H04W 76/19 |
| 2022/0015002 | A1* | 1/2022 | Zhang | ................. H04W 76/15 |
| 2022/0022275 | A1* | 1/2022 | Geng | ................... H04W 76/19 |
| 2022/0070969 | A1* | 3/2022 | Xiao | ..................... H04W 76/34 |
| 2022/0256637 | A1* | 8/2022 | Futaki | ................... H04W 76/19 |
| 2023/0127850 | A1* | 4/2023 | Teyeb | ............. H04W 36/00698 |
| | | | | 370/329 |

OTHER PUBLICATIONS

International Search Report dated Sep. 3, 2021, issued in International Application No. PCT/KR2021/095050.

Extended European Search Report dated Oct. 10, 2023, issued in European Patent Application No. 21812424.6.

Samsung; Split Bearer Fallback at Deactivation of PDCP Duplication; 3GPP TSG-RAN2 Meeting #108, R2-1916222, Nov. 8, 2019, Reno, USA.

3GPP TS 38.331 V16.0.0; 3rd Generation Partnership Project; Technical Specification Group Radio Access Network; NR; Radio Resource Control (RRC) protocol specification (Release 16), Apr. 6, 2020.

3GPP TS 36.331 V16.0.0, 3rd Generation Partnership Project; Technical Specification Group Radio Access Network; Evolved Universal Terrestrial Radio Access (E-UTRA); Radio Resource Control (RRC); Protocol specification (Release 16), Mar. 2020.

Korean Office Action dated Oct. 24, 2025, issued in Korean Patent Application No. 10-2020-0065081.

* cited by examiner

START

TRIGGER MCG FAILURE REPORT OPERATION — 710

START PROCEDURE FOR TRANSMITTING MCG FAILURE INFORMATION MESSAGE BY USING SPLIT SRB1, AND START T316 TIMER — 720

CONFIGURE THAT PRIMARY PATH IS SCG RLC BEARER IN WHICH MCG FAILURE INFORMATION TRANSMISSION IS CONFIGURED — 730

END

START

TRIGGER MCG FAILURE REPORT OPERATION — 1010

START PROCEDURE FOR TRANSMITTING MCG FAILURE INFORMATION MESSAGE BY USING SPLIT SRB1, AND START T316 TIMER — 1020

CONFIGURE THAT PRIMARY PATH IS RLC BEARER WITH BEST LINK QUALITY FROM AMONG SCG RLC BEARERS OF SPLIT SRB1 — 1030

END

METHOD AND DEVICE FOR TRANSMITTING AND RECEIVING DATA IN WIRELESS COMMUNICATION SYSTEM

TECHNICAL FIELD

The present disclosure relates to a method and apparatus for transmitting and receiving data in a wireless communication system.

BACKGROUND ART

In order to meet increasing demand with respect to wireless data traffic after the commercialization of 4th generation (4G) communication systems, efforts have been made to develop 5th generation (5G) or pre-5G communication systems. For this reason, 5G or pre-5G communication systems are called beyond 4G network communication systems or post long-term evolution (post-LTE) systems. In order to achieve high data rates, the implementation of 5G communication systems in an ultra-high frequency millimeter-wave (mmWave) band (e.g., a 60-gigahertz (GHz) band) is being considered. In order to reduce pathloss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. Also, in order to improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and received interference cancellation have been developed. In addition, for 5G systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of Everything (IoE) technology, which is a combination of IoT technology and big data processing technology through connection with a cloud server or the like, is also emerging. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In the IoT environment, intelligent information technology (IT) services may be provided to collect and analyze data obtained from objects connected to each other to create new value in human life. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, technologies related to sensor networks, M2M communication, and MTC are being implemented by using 5G communication technology including beamforming, MIMO, and array antennas. The application of a cloud-RAN as big data processing technology may also be considered as an example of convergence of 5G technology and IoT technology.

Because various services may be provided due to the development of wireless communication systems, methods for seamlessly providing these services are required.

DESCRIPTION OF EMBODIMENTS

Solution to Problem

The present disclosure provides an apparatus and method for transmitting and receiving data in a wireless communication system.

Also, the present disclosure provides an apparatus and method for master cell group (MCG) recovery for at least one radio link control (RLC) entity in a wireless communication system.

BEST MODE

Figure 1:
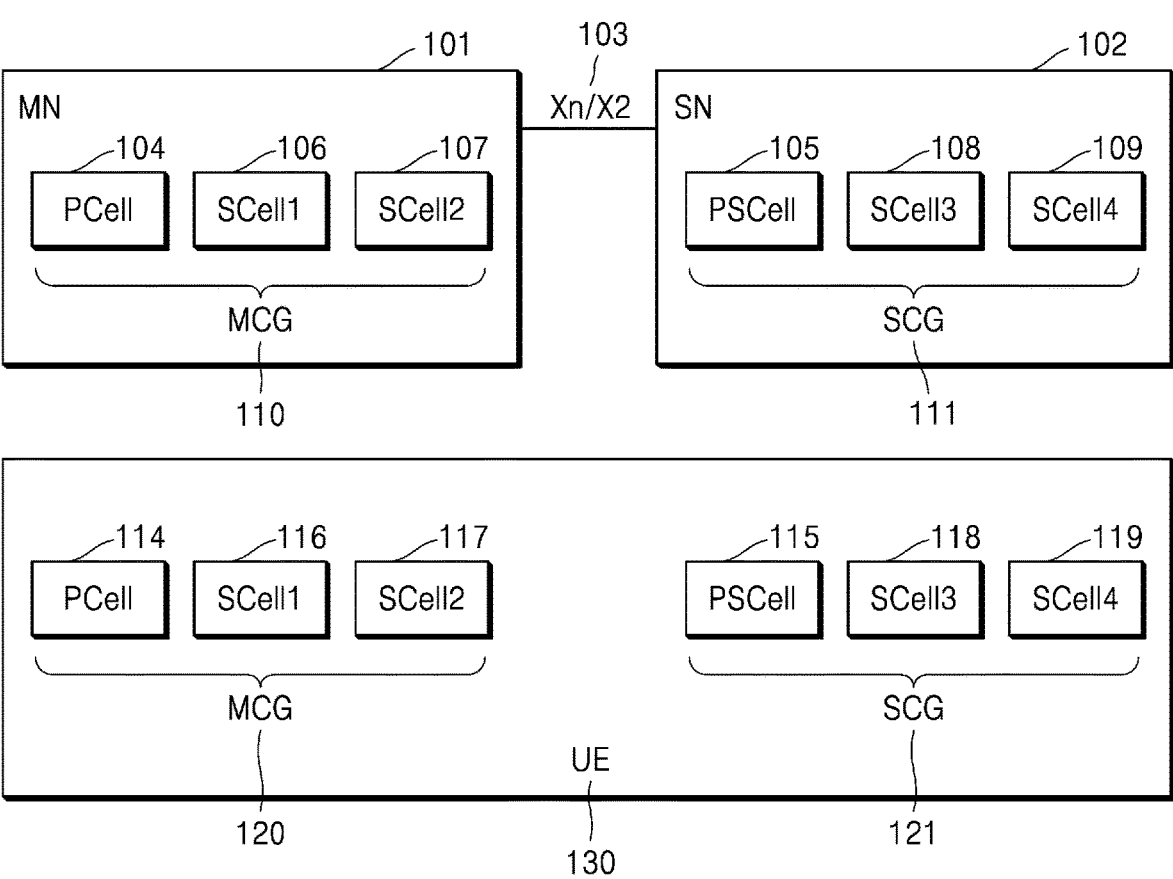
FIG. 1 is a diagram illustrating a dual connectivity (DC) structure of a base station and a user equipment (UE) in a wireless communication system.

According to an embodiment of the present disclosure, an operating method of a terminal that is able to communicate with a master node and a secondary node in a wireless communication system includes detecting a master cell group (MCG) failure related to the master node, in response to the detecting of the MCG failure, changing a primary path of a split signaling radio bearer 1 (SRB1) from a radio link control (RLC) bearer of an MCG related to the master node to one RLC bearer from among a plurality of RLC bearers of a secondary cell group (SCG) related to the secondary node, based on a pre-determined criterion, and transmitting a message related to the MCG failure to the master node, by using the RLC bearer of the SCG changed as the primary path.

According to an embodiment of the present disclosure, an operating method of a terminal that is able to communicate with a master node and a secondary node in a wireless communication method includes detecting a secondary cell group (SCG) failure related to the secondary node, in response to the detecting of the SCG failure, changing a primary path of a split signaling radio bearer 1 (SRB1) from a radio link control (RLC) bearer of an SCG related to the secondary node to one RLC bearer from among a plurality of RLC bearers of a master cell group (MCG) related to the mater node, based on a pre-determined criterion, and transmitting a message related to the SCG failure to the master node, by using at least one RLC bearer of the MCG changed as the primary path.

According to an embodiment of the present disclosure, a terminal that is able to communicate with a master node and a secondary node in a wireless communication system includes a transceiver, and at least one processor configured to detect a master cell group (MCG) failure related to the master node, in response to the detecting of the MCG failure, change a primary path of a split signaling radio bearer 1 (SRB1) from a radio link control (RLC) bearer of an MCG related to the master node to one RLC bearer from among a plurality of RLC bearers of a secondary cell group (SCG)

related to the secondary node, based on a pre-determined criterion, and transmit a message related to the MCG failure to the master node through the transceiver, by using the RLC bearer of the SCG changed as the primary path.

Mode of Disclosure

Embodiments of the present disclosure will now be described more fully with reference to the accompanying drawings. While describing the present disclosure, detailed descriptions of related well-known functions or configurations that may blur the points of the present disclosure are omitted. The terms used herein are those defined in consideration of functions in the present disclosure, and may vary according to the intention of users or operators, precedents, etc. Hence, the terms used herein should be defined based on the meaning of the terms together with the descriptions throughout the specification.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for performing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions stored in the flowchart block(s). Because the computer program instructions may also be loaded into a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in reverse order, according to the functionality involved.

The term " . . . unit" used in the present embodiment refers to a software or hardware component, such as a field-programmable gate array (FPGA) or an application-specific integrated circuit (ASIC), which performs certain tasks. However, the term " . . . unit" does not mean to be limited to software or hardware. A " . . . unit" may be configured to be in an addressable storage medium or may be configured to operate one or more processors. Thus, a " . . . unit" may include, by way of example, components, such as software components, object-oriented software components, class components, and task components, processes, functions, attributes, procedures, subroutines, segments of program code, drivers, firmware, microcode, circuitry, data, data-bases, data structures, tables, arrays, and variables. The functionality provided in components and " . . . units" may be combined into fewer components and " . . . units" or may be further separated into additional components and " . . . units". Furthermore, components and " . . . units" may be implemented to operate one or more central processing units (CPUs) in a device or a secure multimedia card. Also, a " . . . unit" in an embodiment may include one or more processors.

In the following descriptions of the present disclosure, well-known functions or configurations are not described in detail because they would obscure the present disclosure with unnecessary details. Hereinafter, embodiments of the present disclosure will be described with reference to the drawings.

Hereinafter, terms for identifying access nodes, terms indicating network entities, terms indicating messages, terms indicating an interface between network entities, and terms indicating various pieces of identification information used herein are exemplified for convenience of explanation. Accordingly, the present disclosure is not limited to the terms described below, and other terms indicating objects having equal technical meanings may be used.

In the following description, a physical channel and a signal may be interchangeably used with data or a control signal. For example, a physical downlink shared channel (PDSCH) refers to a physical channel through which data is transmitted, but a PDSCH may be used to denote data. That is, in the present disclosure, when a 'physical channel is transmitted', it may be interpreted as 'data or a signal is transmitted through a physical channel'.

Hereinafter, in the present disclosure, higher layer signaling refers to a method of transmitting a signal from a base station to a terminal by using a downlink data channel of a physical layer or transmitting a signal from a terminal to a base station by using an uplink data channel of a physical layer. Higher layer signaling may be radio resource control (RRC) signaling or a media access control (MAC) control element (CE).

Hereinafter, some terms and names defined in the 3$^{rd}$ generation partnership project long term evolution (3GPP LTE) standard may be used for convenience of explanation. However, the present disclosure may not be limited to the terms and names, and may also be applied to systems following other standards. In particular, the present disclosure may be applied to a 3GPP New Radio (NR, 5$^{th}$ generation mobile communication standards). In the present disclosure, an evolved node B (eNB) may be interchangeably used with a next-generation node B (gNB) for convenience of explanation. That is, a base station described as an eNB may represent a gNB. Also, the term 'terminal' may indicate not only mobile phones, narrow band-Internet of Things (NB-IoT) devices, and sensors, but also other wireless communication devices.

Hereinafter, a base station is an entity that allocates resources to a terminal and may be at least one of a gNode B, an eNode B, a node B, a base station (BS), a radio access unit, a base station controller, or a node on a network. A terminal may include a user equipment (UE), a mobile station (MS), a cellular phone, a smartphone, a computer, or a multimedia system capable of performing a communication function. However, the present disclosure is not limited to the above examples.

The present disclosure relates to a method and apparatus for fast master cell group (MCG) recovery for multiple radio link control (RLC) entities.

FIG. 1 is a diagram illustrating a dual connectivity (DC) structure of a base station and a user equipment (UE) in a wireless communication system.

In a DC structure, a base station may have two base station nodes (e.g., 101 and 102), which may be connected to each other through an Xn interface or an X2 interface 103. In the base station having the above DC structure, a node mainly connected to a UE may be referred to as a master node (MN) 101, and a node auxiliary connected for the DC structure may be referred to as a secondary node (SN) 102. Among them, the MN may be an anchor point of a signaling radio bearer 1 (SRB1) capable of indicating radio resource control (RRC) configuration for the UE and a signaling radio bearer 2 (SRB2) capable of transmitting a non-access stratum (NAS) message for configuring connection between the UE and a core network.

Each node (e.g., the MN or the SN) may be connected to the UE through one or more cells to perform communication. In this case, the cells may include a primary cell (PCell) 104 essentially connected to the MN, a primary secondary cell (PSCell) 105 essentially connected to the SN, and secondary cells (SCells) (e.g., a SCell1 106, a SCell2 107, a SCell3 108, and a SCell4 109) which the nodes auxiliary have. Among them, cells managed by the MN may be collectively referred to as a master cell group (MCG) 110, and cells managed by the SN may be collectively referred to as a secondary cell group (SCG) 111.

A UE 130 may communicate with the base station through a PCell 114, a PSCell 115, and additional SCells (e.g., a SCell1 116, a SCell2 117, a SCell3 118, and a SCell4 119). In this case, the PCell, the PSCell, and each SCell for the UE and the PCell, the PSCell, and each SCell for the base station may not be physically different from each other, but may refer to resources of the same frequency band corresponding to each other. Accordingly, in a process of connecting the base station to the UE, the base station and the UE may be configured to have an MCG 120 and an SCG 121.

In the above DC structure, when a radio link situation is poor and thus an SCG radio link failure (RLF) occurs, an SCG failure information message may be transmitted to the MN through the MCG. The SCG failure information message maybe transmitted to the SRB1, and the base station receiving the message may indicate a reconfiguration or release operation of the SCG in which the SCG RLF has occurred. In this case, data transmitted to the MCG may be continuously transmitted without interruption. As such, the reason why data transmitted to the MCG is continuously transmitted without interruption is that the SCG RLF is purely a problem with the SCG and thus may not badly affect transmission to the MCG. In addition, even when a reconfiguration failure of the SCG occurs, an SCG failure information message may be transmitted. In general, the SCG RLF and the reconfiguration failure may be collectively referred to as an SCG failure.

On the other hand, when a radio link situation of the MCG is poor and thus an MCG RLF occurs, because the radio link situation of the MCG is poor, information related to the MCG RLF may not be transmitted to the MCG. Accordingly, as described above, when the information related to the MCG RLF may not be transmitted to the MCG, it may be necessary to reconfigure the MCG by performing an RRC connection reestablishment procedure. In the RRC connection reestablishment procedure, because a corresponding operation (e.g., an operation for RRC connection reestablishment) is performed only in the radio link situation of the MCG regardless of a connection state of the SCG, data transmission to the SCG may also be interrupted. However, in this case, when the SCG is available, it may not be necessary to interrupt data transmission to the SCG. When a report of the MCG RLF may be made to the SCG, interruption due to the RRC connection reestablishment may not occur and interruption of data transmission to the SCG may not occur. In addition, the RRC connection reestablishment operation may be performed even when RRC reconfiguration with synchronization or handover fails, and even in this case (e.g., the RRC reconfiguration with synchronization or handover fails), a method similar to an MCG RLF report may be used. According to an embodiment, a failure of reconfiguration with synchronization or handover as described above may be collectively referred to as an MCG failure.

Figure 2:
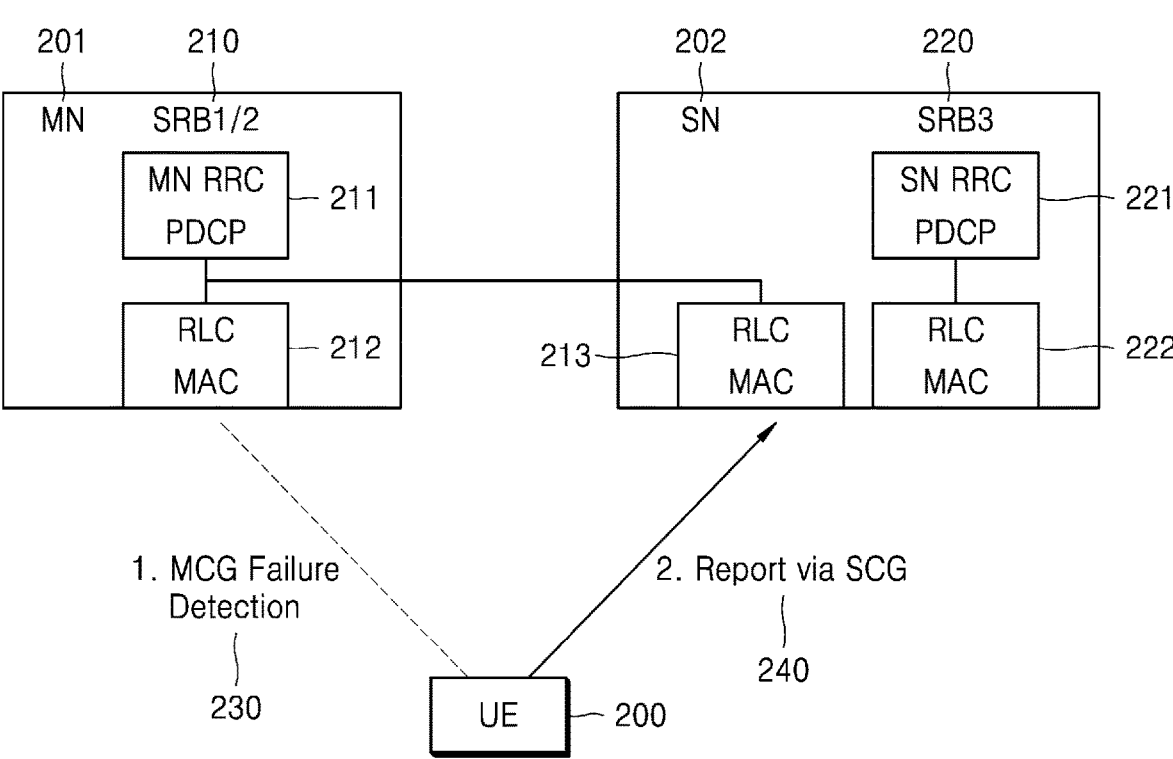
FIG. 2 is a diagram illustrating a signaling radio bearer (SRB) structure of a base station and a method by which, when a master cell group (MCG) failure occurs, a UE notifies the MCG failure to the base station, according to an embodiment of the present disclosure.

FIG. 2 is a diagram illustrating a signaling radio bearer (SRB) structure of a base station and a method by which, when a master cell group (MCG) failure occurs, a UE notifies the MCG failure to the base station, according to an embodiment of the present disclosure.

A signaling radio bearer (SRB) may refer to a radio bearer for radio resource control (RRC) configuration by a base station. The base station may indicate a procedure such as RRC configuration, reconfiguration, or reestablishment through the SRB. Also, a UE may transmit a response message to a configuration, reconfiguration, or reestablishment message of the base station through the SRB, and may transmit a message to be triggered by the UE. For example, the UE may transmit an SCG failure information message transmitted when an SCG failure occurs by using the SRB.

According to an embodiment, the SRB may be configured to include an SRB1, an SRB2, and an SRB3. The SRB1 or the SRB2 210 may be configured between an MN 201 and the UE, and the SRB3 220 may be configured between an SN 202 and the UE. According to an embodiment, the SRB1 (e.g., the SRB1 from among the SRB1 and the SRB2 210) may be used to transmit messages for direct connection between the UE and the base station. The SRB2 (e.g., the SRB2 from among the SRB1 and the SRB2 210) may be mainly used to transmit a non-access stratum (NAS) message between a core network and the UE. The SRB3 220 may be used to transmit messages for direct connection between the SN and the UE. In this case, for the SRB1 or the SRB2 210, an RRC and a packet data convergence protocol (PDCP) 221 may be located in the MN, and a radio link control (RLC) and a medium access control (MAC) 212 and 213 may be respectively located in the MN and the SN. In this case, when an RLC is located in only one of an MCG or an SCG, the SRB may be referred to as a non-split SRB, and when an RLC is located in both the MCG and the SCG, the SRB may be referred to as a split SRB. That is, in an embodiment of FIG. 2, the SRB1 may be referred to as split SRB1. In contrast, for the SRB3 220, an RRC and a PDCP 221 are located in the SN and an RLC and a MAC 222 are also located in the SN. Although only a part of the SRB is described in an embodiment of FIG. 2, a data radio bearer (DRB) through which data is to be transmitted may also be configured when the UE and the base station are connected to each other.

When a UE 200 detects an MCG failure due to an MCG RLF or a failure of reconfiguration with synchronization (MCG failure detection 230), transmission using the MCG is no longer possible. Accordingly, it is necessary to notify information indicating that the MCG failure has occurred to the base station. In this case, when the UE 200 is able to use an SCG link, the UE 200 may transmit a message for reporting the MCG failure by using the SCG (report via SCG 240). According to an embodiment, the message for reporting the MCG failure may be referred to as an MCG failure information message. In this case, when the SRB1 is configured, the UE may use the split SRB1. Alternatively, when the SRB3 is configured, the UE may transmit corresponding MCG failure information to the SN 202 through the SRB3. However, when the UE transmits the MCG failure information to the SN 202 through the SRB3, an anchor node of the SRB3 is the SN 202, and thus, the UE needs to send the information back to the MN 201 in charge of MCG connection. In this case, the content of a failure report message 240 transmitted to the SRB3 may be forwarded to the MN 201. However, in another embodiment, the UE may reprocess and transmit information indicating a UE in which the MCG failure has occurred and a reason for the MCG failure by using a message different from the failure report message 240 transmitted to the SRB3. Next, the base station or the MN of the base station may indicate reconfiguration with synchronization or handover for changing the MCG to the UE, in order to solve the MCG failure. In an embodiment, a role swap of exchanging functions of the MN 201 and the SN 202 may be indicated.

According to an embodiment, the MCG failure information message may include the following information.

a cell group in which the failure has occurred (MCG failure or SCG failure)

a failure type (RLF or failure with synchronization)

measurement report configured by the MN measurement report configured by the SN

When the SCG is operated by another radio access technology (RAT), a measurement report configured by the SN may be encoded with coding used by the RAT of the SCG.

Figure 3:
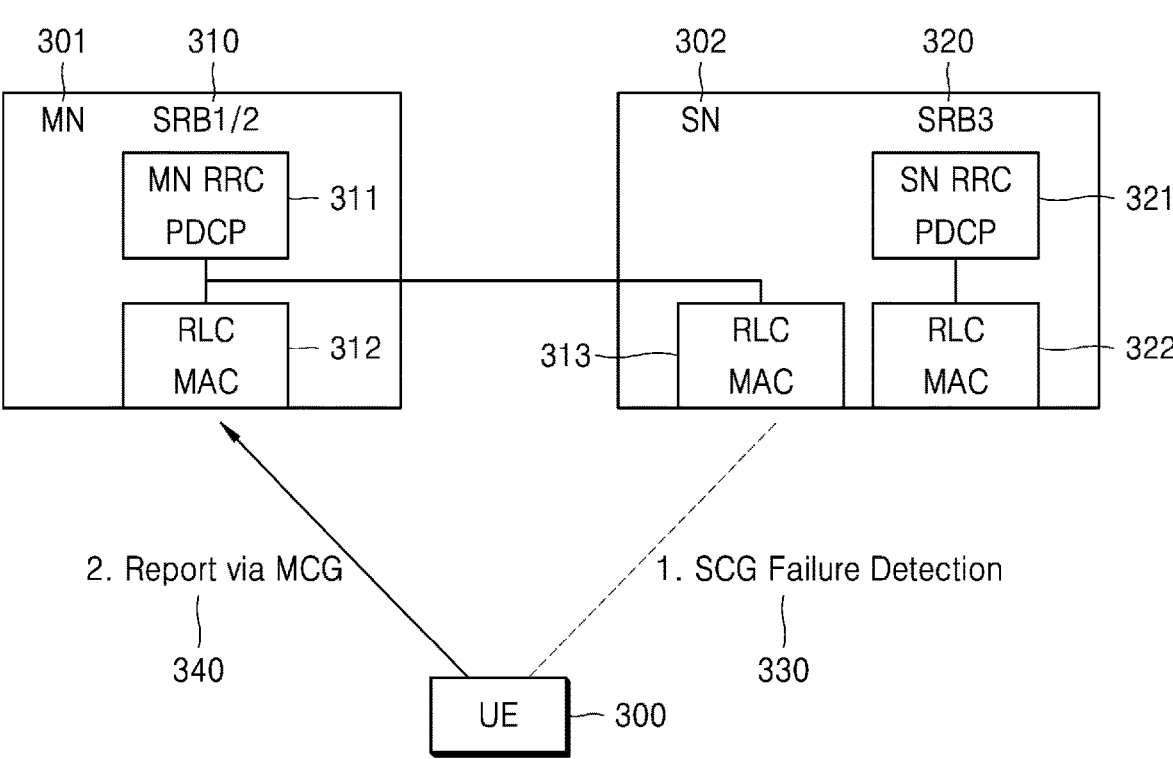
FIG. 3 is a diagram illustrating an SRB structure of a base station and a method by which, when a secondary cell group (SCG) failure occurs, a UE notifies the SCG failure to the base station, according to an embodiment of the present disclosure.

FIG. 3 is a diagram illustrating an SRB structure of a base station and a method by which, when a secondary cell group (SCG) failure occurs, a UE notifies the SCG failure to the base station, according to an embodiment of the present disclosure.

A signaling radio bearer (SRB) may refer to a radio bearer for radio resource control (RRC) configuration by a base station. The base station may indicate a procedure such as RRC configuration, reconfiguration, or reestablishment through the SRB. Also, a UE may transmit a response message to a configuration, reconfiguration, or reestablishment message of the base station through the SRB, and may transmit a message to be triggered by the UE. For example, the UE may transmit an SCG failure information message, which is transmitted when an SCG failure occurs, through the SRB.

According to an embodiment, the SRB may be configured to include an SRB1, an SRB2, and an SRB3. The SRB1 or the SRB2 310 may be configured between an MN 301 and the UE, and the SRB3 320 may be configured between an SN 302 and the UE. According to an embodiment, the SRB1 (e.g., the SRB1 from among the SRB1 and the SRB2 310)

may be used to transmit messages for direct connection between the UE and the base station. The SRB2 (e.g., the SRB2 from among the SRB1 and the SRB2 310) may be mainly used to transmit a non-access stratum (NAS) message between a core network and the UE. The SRB3 320 may be used to transmit messages for direct connection between the SN and the UE. In this case, for the SRB1 or the SRB2, an RRC and a PDCP 311 may be located in the MN, and a radio link control (RLC) and a medium access control (MAC) 312 and 313 may be respectively located in the MN and the SN. In this case, when an RLC is located only in one of an MCG or an SCG, the SRB may be referred to as a non-split SRB, and when an RLC is located in both the MCG and the SCG, the SRB may be referred to as a split SRB. That is, in an embodiment of FIG. 3, the SRB1 may be referred to as a split SRB1. In contrast, for the SRB3 320, an RRC and a PDCP 321 are located in the SN and an RLC and a MAC 322 are also located in the SN. Although a part of the SRB is described in an embodiment of FIG. 3, a data radio bearer (DRB) through which data is to be transmitted may also be configured when the UE is connected to the base station.

When a UE 300 detects an SCG failure due to an SCG RLF or a failure of SCG reconfiguration (SCG failure detection 330), transmission using the SCG is no longer possible. Accordingly, it is necessary to notify information indicating that the SCG failure has occurred to the base station. In this case, when the UE 300 is able to use an MCG link, the UE 300 may transmit a message for reporting the SCG failure by using the MCG (report via MCG 340). According to an embodiment, the message for reporting the SCG failure may be referred to as an SCG failure information message. In this case, when the SRB1 is configured, the UE may use the SRB1. Next, the base station or the MN of the base station may indicate reconfiguration with synchronization and SCG change for changing the SCG to the UE, in order to solve the SCG failure.

Figure 4:
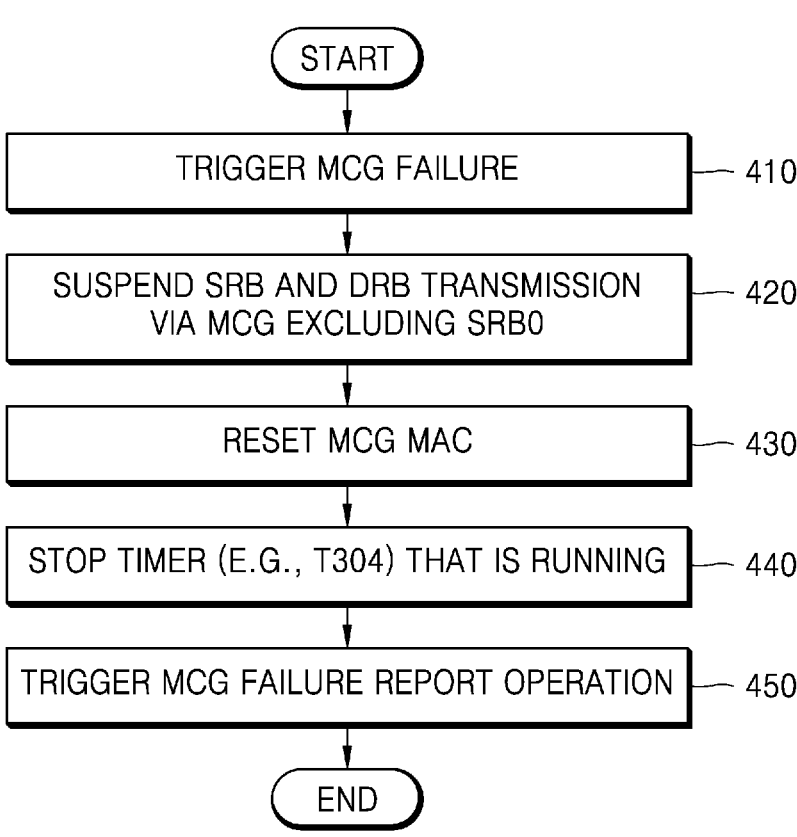
FIG. 4 is a diagram illustrating an operation process of a UE when an MCG failure occurs, according to an embodiment of the present disclosure.

FIG. 4 is a diagram illustrating an operation process of a UE when an MCG failure occurs, according to an embodiment of the present disclosure.

Referring to FIG. 4, in operation 410, an MCG failure may be triggered. For example, an MCG failure, e.g., expiration of a T310 timer, a random access failure, an MCG RLF such as reach of an RLC maximum retransmission number, a handover failure, or a reconfiguration failure with synchronization, may be triggered for a UE.

In operation 420, the UE may suspend SRB and DRB transmission via an MCG excluding an SRB0. For example, because data transmission to the MCG may not be properly performed in an MCG failure situation, the UE may suspend all signaling radio bearer (SRB) and data radio bearer (DRB) transmission via the MCG. However, in this case, because the SRB0 may need to be used when next radio link reestablishment occurs, the UE should not suspend the SRB0.

In operation 430, the UE may reset an MCG medium access control (MAC). For example, because the UE may not be able to use a MAC of the MCG, the UE may reset the MAC of the MCG.

In operation 440, when there is a timer (e.g., T304) that is running, the UE may stop the running timer. For example, when there is the T304 timer for handover or any other timer that is running, there is no need to run the timer, and thus, the UE may stop the timer. Although operation 430 and operation 440 are sequentially described, operation 430 and operation 440 may be simultaneously performed.

In operation 450, the UE may trigger an MCG failure report operation. For example, the UE may notify the MCG failure to a base station by triggering the MCG failure report operation. A notification indicating that the MCG failure has occurred may be made through an SCG. A radio bearer used for the notification may include a split SRB1 that may be transmitted through the SCG or a signaling radio bearer 3 (SRB3) that is directly transmitted to a SN. According to an embodiment of the present disclosure, when the MCG failure report operation is triggered, it may mean that a procedure by which the UE reports that the MCG failure has occurred to the base station starts.

When the MCG failure report operation is triggered, the UE may transmit an MCG failure information message to the base station. When the UE transmits the MCG failure information message to the base station by using the split SRB1, in an embodiment, the UE may change a primary path of the split SRB1 to one of RLC bearers configured in the SCG and may rapidly transmit the MCG failure information message.

Figure 5:
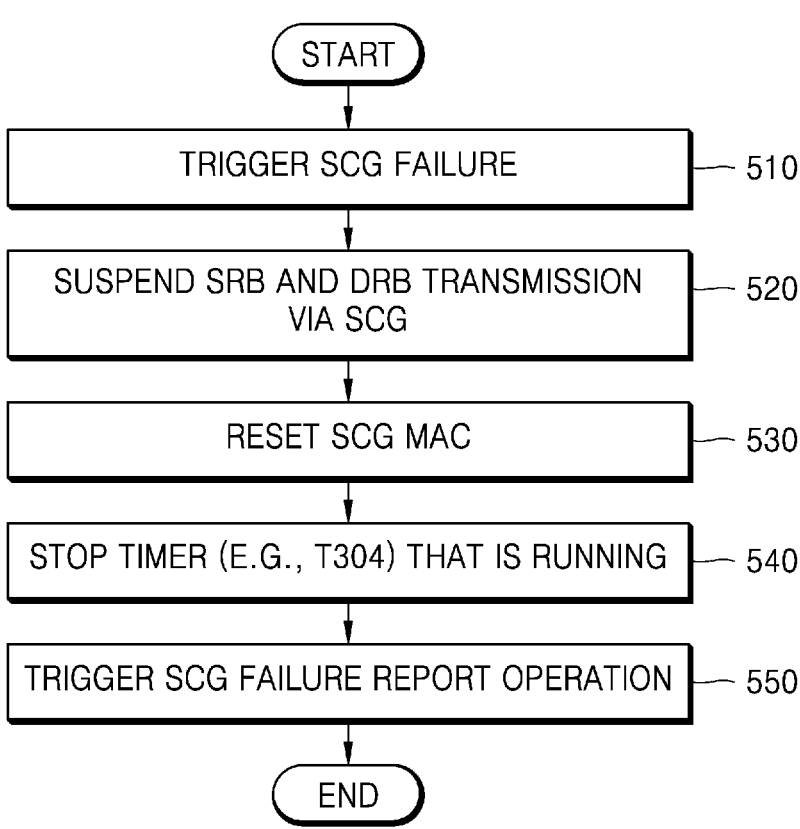
FIG. 5 is a diagram illustrating an operation process of a UE when an SCG failure occurs, according to an embodiment of the present disclosure.

FIG. 5 is a diagram illustrating an operation process of a UE when an SCG failure occurs, according to an embodiment of the present disclosure.

Referring to FIG. 5, in operation 510, an SCG failure may be triggered. For example, an SCG failure, e.g., expiration of a T313 timer for a UE, a random access failure to an SCG, an SCG RLF such as reach of an SCG RLC maximum retransmission number, an SCG configuration failure, or an SCG reconfiguration failure with synchronization, may be triggered.

In operation 520, the UE may suspend SRB and DRB transmission via the SCG. For example, because data transmission to the SCG may not be properly performed in an SCG failure situation, the UE may suspend all signaling radio bearer (SRB) and data radio bearer (DRB) transmission via the SCG.

In operation 530, the UE may reset an SCG MAC. For example, because the UE may not be able to use a MAC of the SCG, the UE may reset the MAC of the SCG.

In operation 540, when there is a timer (e.g., T304) that is running, the UE may stop the running timer. For example, when there is the T304 timer for handover or any other timer that is running, there is no need to run the timer, and thus, the UE may stop the timer. Although operation 530 and operation 540 are sequentially described, operation 530 and operation 540 may be simultaneously performed.

In operation 550, the UE may trigger an SCG failure report operation. For example, the UE may notify the SCG failure to a base station by triggering the SCG failure report operation. A notification indicating that the SCG failure has occurred may be made through an MCG. A radio bearer used for the notification may be an SRB1 that may be transmitted through the MCG.

When the SCG failure report operation is triggered, the UE may transmit an SCG failure information message to the base station. When the UE transmits the SCG failure information message to the base station by using the split SRB1, in an embodiment, the UE may change a primary path of the split SRB1 to one of RLC bearers configured in the MCG and may rapidly transmit the SCG failure information message. According to an embodiment of the present disclosure, when the SCG failure report operation is triggered, it may mean that a procedure by which the UE reports that an MCG failure has occurred to the base station starts.

Figure 6:
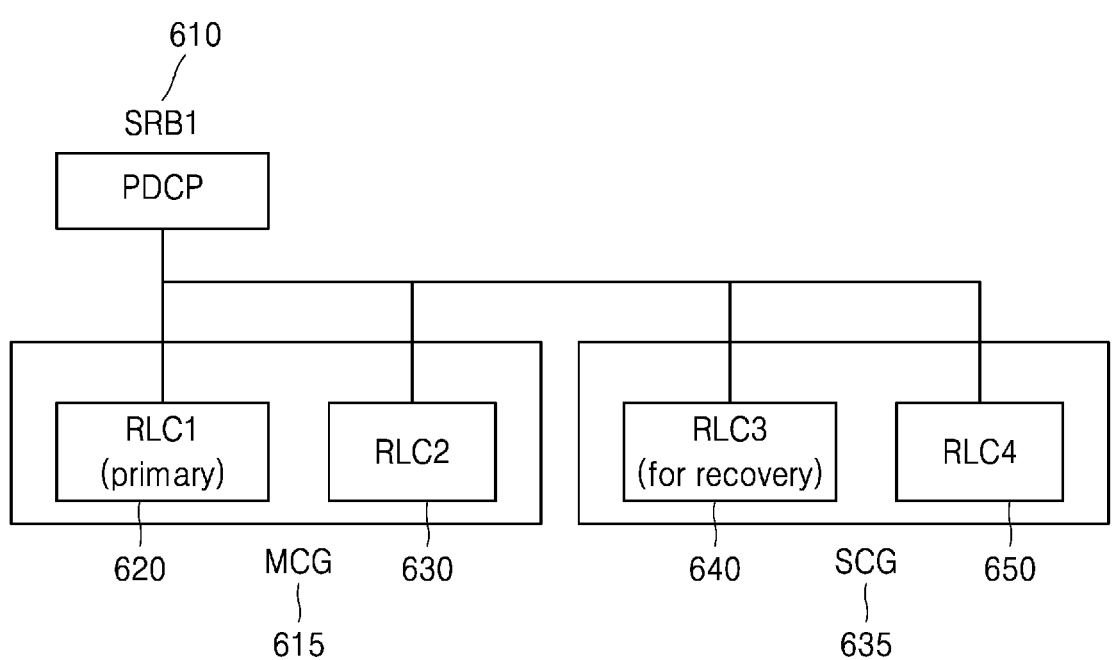
FIG. 6 is a diagram illustrating a protocol structure of a split signaling radio bearer 1 (SRB1) in which a plurality of radio link control (RLC) bearers are configured, according to an embodiment of the present disclosure.

FIG. 6 is a diagram illustrating a protocol structure of a split SRB1 in which a plurality of radio link control (RLC) bearers are configured, according to an embodiment of the present disclosure.

Referring to FIG. 6, a split SRB 610 may correspond to one PDCP entity, and may be configured to transmit an RRC message. For one packet data convergence protocol (PDCP) layer, a split SRB may include two or more radio link control bearers (e.g., an RLC1 620, an RLC2 630, an RLC3 640, and an RLC4 650), and may include at least one SCG RLC bearer (e.g., the RLC3 640 and the RLC4 650) and at least one MCG RLC bearer (e.g., the RLC1 620 and the RLC2 630). In this case, the term 'RLC bearer' used herein may be interchangeably used with an RLC entity or a logical channel. An RLC bearer may correspond to an RLC entity or a logical channel in a one-to-one manner.

According to an embodiment, a cell group used in the split SRB 610 may include two or more cell groups. In an embodiment of FIG. 6, a DC structure may be assumed, and two cell groups, that is, a master cell group (MCG) 615 and a secondary cell group (SCG) 635, may be assumed. An RLC bearer configured in the MCG 615 may be referred to as an MCG RLC bearer, and an RLC bearer configured in the SCG 635 may be referred to as an SCG RLC bearer. Also, an RRC of the split SRB1 610 may be located in an MN, and the MN may manage RRC connection of a UE. In this case, from among the RLC entities (e.g., the RLC1 620, the RLC2 630, the RLC3 640, and the RLC4 650) of the split SRB 610, the RLC 620 may be configured as a primary path that is always used for data transmission regardless of the amount of transmitted data. The RLC entities (e.g., the RLC2 630, the RLC3 640, and the RLC4 650) other than the primary RLC entity corresponding to the primary path may be used as secondary RLC entities for packet duplication transmission. According to an embodiment, packet duplication transmission may refer to a transmission method by which a PDCP entity duplicates a PDCP protocol data unit (PDU) and transmits the same PDCP PDU to another RLC bearer.

According to an embodiment, when the split SRB1 including two or more RLC entities is configured and data needs to be transmitted by using the split SRB1 due to an MCG failure, it is necessary to configure in advance an SCG RLC using which the UE should transmit an MCG failure information message. For example, in order to stably transmit the MCG failure information message, an appropriate SCG RLC may be configured in advance by the determination of a communication network. Also, in the case of an SRB in which packet duplication transmission is not configured or packet duplication transmission is not activated, an RLC bearer other than a primary path is not used for uplink packet transmission unless an MCG failure occurs. Accordingly, it may be advantageous for the base station to configure in advance an RLC bearer that may be used when an MCG failure occurs, for fast uplink resource allocation or the like. For example, in an embodiment of FIG. 6, there may be two RLC bearers (e.g., the RLC3 640 and the RLC4 650) that may be used as candidate RLC bearers when an MCG failure occurs and an MCG failure information message should be transmitted by using an SCG RLC of the split SRB1. In this case, in an embodiment of FIG. 6, it may be assumed that the RLC3 640 is configured as an RLC bearer that may be used when an MCG failure occurs. As such, an RLC entity that may be used when an MCG failure occurs may be an RLC bearer that is not a primary path and is configured in a cell group different from the primary path. In an embodiment of FIG. 6, the RLC3 640 and the RLC4 650 may be RLC bearers configured in a cell group different from the primary path. However, it may be assumed that the RLC3 640 is an RLC bearer that may be used when an MCG failure occurs by configuration.

Figure 7:
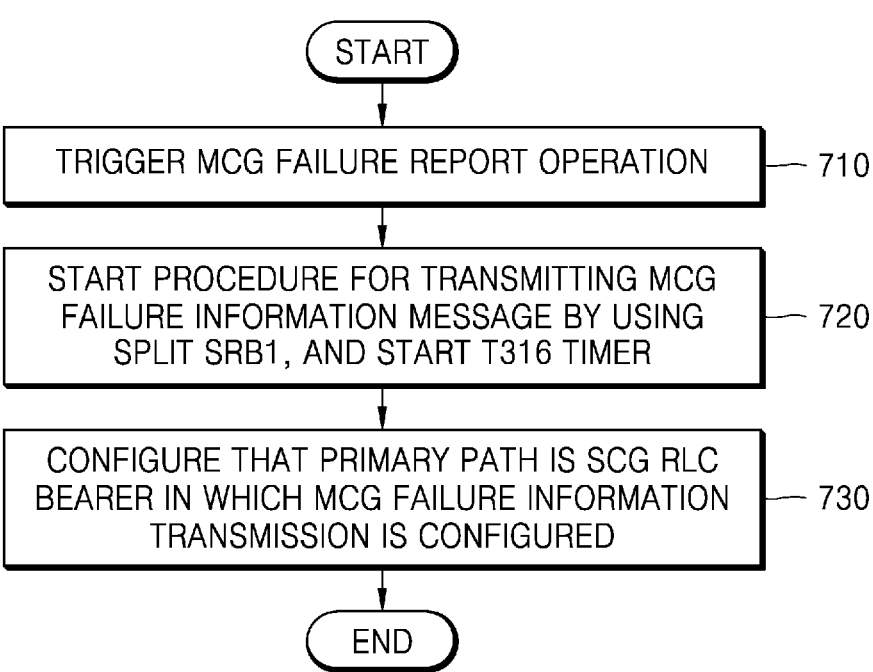
FIG. 7 is a diagram illustrating a UE operation when an MCG radio link failure (RLF) occurs, according to an embodiment of the present disclosure.

FIG. 7 is a diagram illustrating a UE operation when an MCG radio link failure (RLF) occurs, according to an embodiment of the present disclosure.

Referring to FIG. 7, in operation 710, a UE may trigger an MCG failure report operation. For example, when an MCG RLF occurs, the UE in which an MCG failure report is configured may trigger the MCG failure report operation as described with reference to FIGS. 2 and 4.

In operation 720, the UE may start a procedure for transmitting an MCG failure information message by using a split SRB1, and may start a T316 timer.

According to an embodiment, when an MCG failure report is configured in the UE, it may mean that the T316 timer that is a timer for an MCG failure report is configured. When the split SRB1 is configured, the UE may start the procedure for transmitting the MCG failure information message by using the split SRB1. For the procedure for transmitting the MCG failure information message, the UE may suspend SRB and DRB transmission via an MCG excluding an SRB0 described in FIG. 4, and may perform a procedure for resetting an MCG MAC. The UE may start the T316 timer that is a timer for configuring an MCG failure report. The T316 timer may be stopped when an RRC reconfiguration message or the like is received from a base station. When the T316 timer expires, the UE may perform an RRC connection reestablishment procedure.

In operation 730, the UE may configure that a primary path is an SCG RLC bearer in which MCG failure transmission is configured.

According to an embodiment, when the split SRB1 is used, a primary path of the split SRB1 may be configured in advance as an RLC entity connected to the MCG. Because a threshold value for split (ul-DataSplitThreshold) may have an infinity value or a positive value other than 0, even when the MCG failure report operation is triggered, the UE may not be able to transmit the MCG failure information message to an SCG. Accordingly, in order to prevent this problem, the primary path may be changed to a pre-configured RLC bearer (logical channel or RLC entity) for MCG failure information transmission. For example, the pre-configured RLC bearer for MCG failure information transmission may be an SCG RLC bearer. Accordingly, the UE may transmit data to the RLC entity connected to the SCG. According to an embodiment, a procedure for changing the primary path in operation 730 may be applied only when the primary path is configured as an MCG RLC. However, the present disclosure is not limited thereto.

According to an embodiment, the RLC bearer for MCG failure information transmission may be a split secondary RLC bearer that may be used during split bearer fallback. Otherwise, a separate RLC bearer for MCG failure information transmission may be transmitted by an RRC reconfiguration message. The base station may include stable cells for connection with the UE in a cell list in which the RLC bearer for MCG failure information transmission may be used, to reduce the risk of delay or interruption of data transmission and reception of the RLC bearer while the MCG failure report operation is performed. Although operation 720 and operation 730 are sequentially described according to an embodiment, operation 720 and operation 730 may be performed in reverse order.

Figure 8:
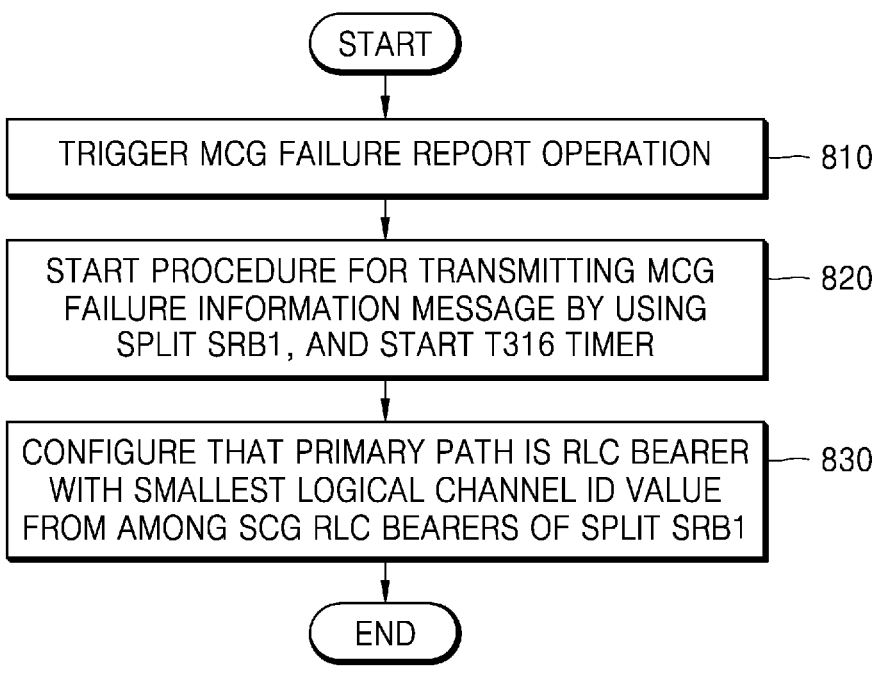
FIG. 8 is a diagram illustrating a UE operation when an MCG RLF occurs, according to an embodiment of the present disclosure.

FIG. 8 is a diagram illustrating a UE operation when an MCG RLF occurs, according to an embodiment of the present disclosure.

Referring to FIG. 8, in operation 810, a UE may trigger an MCG failure report operation. For example, when an MCG RLF occurs, the UE in which an MCG failure report is configured may trigger the MCG failure report operation as described with respect to FIGS. 2 and 4.

In operation 820, the UE may start a procedure for transmitting an MCG failure information message by using a split SRB1, and may start a T316 timer.

According to an embodiment, when an MCG failure report is configured in the UE, it may mean that the T316 timer that is a timer for an MCG failure report is configured. When the split SRB1 is configured, the UE may start the procedure for transmitting the MCG failure information message by using the split SRB1. For the procedure for transmitting the MCG failure information message, the UE may suspend SRB and DRB transmission via an MCG excluding an SRB0 described in FIG. 4, and may perform a procedure for resetting an MCG MAC. The UE may start the T316 timer that is a timer for configuring an MCG failure report. The T316 timer may be stopped when an RRC reconfiguration message or the like is received from a base station. However, when the T316 timer expires, the UE may perform an RRC connection reestablishment procedure.

In operation 830, the UE may configure that a primary path is an RLC bearer with a smallest logical channel identifier (LCID) value from among SCG RLC bearers of the split SRB1. For example, when the split SRB1 is used, a primary path of the split SRB1 may be configured in advance as an RLC entity connected to the MCG. Because a threshold value for split (ul-DataSplitThreshold) may have an infinity value or a positive value other than 0, even when the MCG failure report operation is triggered, the UE may not be able to transmit the MCG failure information message to an SCG. Accordingly, in order to prevent this problem, the UE may change the primary path to an RLC bearer (logical channel or RLC entity) with a smallest logical channel identifier (LCID) value from among the SCG RLC bearers of the split SRB1.

A procedure for changing the primary path in operation 830 may be applied only when the primary path is configured as an MCG RLC. However, the present disclosure is not limited thereto. Through the primary path change as described above, the UE may transmit data to the RLC entity connected to the SCG. Also, when the base station receives uplink data from the RLC bearer with the smallest LCID value from among the SCG RLC bearers, the base station may recognize that the MCG failure information message is a message generated by the MCG failure report operation. The base station may include stable cells for connection with the UE, in a cell list in which the RLC bearer with the smallest LCID value may be used from among the SCG RLC bearers for MCG failure information transmission. Accordingly, the risk of interruption or delay of data transmission and reception of the RLC bearer may be reduced while the UE performs the MCG failure report operation. Although operation 820 and operation 830 are sequentially described according to an embodiment, operation 820 and operation 830 may be performed in reverse order.

Figure 9:
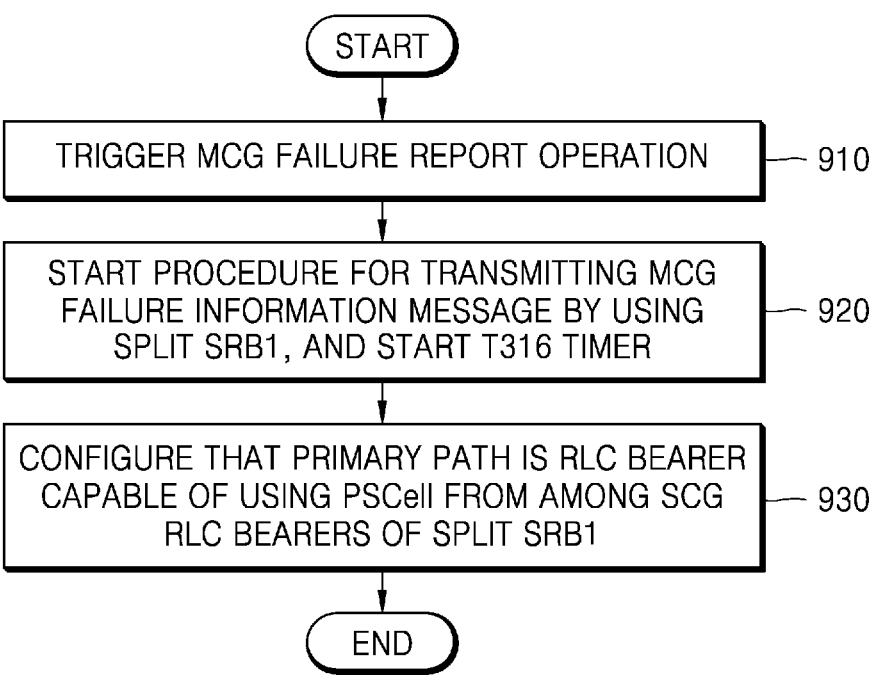
FIG. 9 is a diagram illustrating a UE operation when an MCG RLF occurs, according to an embodiment of the present disclosure.

FIG. 9 is a diagram illustrating a UE operation when an MCG RLF occurs, according to an embodiment of the present disclosure.

Referring to FIG. 9, in operation 910, a UE may trigger an MCG failure report operation. For example, when an MCG RLF occurs, the UE in which an MCG failure report is configured may trigger the MCG failure report operation as described with reference to FIGS. 2 and 4.

In operation 920, the UE may start a procedure for transmitting an MCG failure information message by using a split SRB1, and may start a T316 timer.

According to an embodiment, when an MCG failure report is configured in the UE, it may mean that the T316 timer that is a timer for an MCG failure report is configured. When the split SRB1 is configured, the UE may start the procedure for transmitting the MCG failure information message by using the split SRB1. For the procedure for transmitting the MCG failure information message, the UE may suspend SRB and DRB transmission via an MCG excluding an SRB0 described in FIG. 4, and may perform a procedure for resetting an MCG MAC. The UE may start the T316 timer that is a timer for configuring an MCG failure report. The T316 timer may be stopped when an RRC reconfiguration message or the like is received from a base station. However, when the T316 timer expires, the UE may perform an RRC connection reestablishment procedure.

In operation 930, the UE may configure that a primary path is an RLC bearer capable of using a PSCell from among SCG RLC bearers of the split SRB1. For example, when the split SRB1 is used, a primary path of the split SRB1 may be configured in advance as an RLC entity connected to the MCG. Because a threshold value for split (ul-DataSplitThreshold) may have an infinity value or a positive value other than 0, even when the MCG failure report operation is triggered, the UE may not be able to transmit the MCG failure information message to an SCG. Accordingly, in order to prevent this problem, the UE may change the primary path to an RLC bearer (logical channel or RLC entity) capable of using a primary secondary cell (PSCell) from among the SCG RLC bearers of the split SRB1.

A procedure for changing the primary path in operation 930 may be applied only when the primary path is configured as an MCG RLC. However, the present disclosure is not limited thereto. Because the PSCell is a cell that may have a most stable connection state in the SCG, the risk of interruption or delay of data transmission and reception of the RLC bearer during the MCG failure report operation may be reduced. A cell list in which the RLC bearer may be used may be configured by logical channel configuration included in the RRC reconfiguration message. Accordingly, the UE may transmit data to the RLC entity connected to the SCG. Also, when the base station receives uplink data from the RLC bearer capable of using the PSCell from among the SCG RLC bearers, the base station may recognize that the MCG failure information message is a message generated by the MCG failure report operation. Although operation 920 and operation 930 are sequentially described according to an embodiment, operation 920 and operation 930 may be performed in reverse order.

Figure 10:
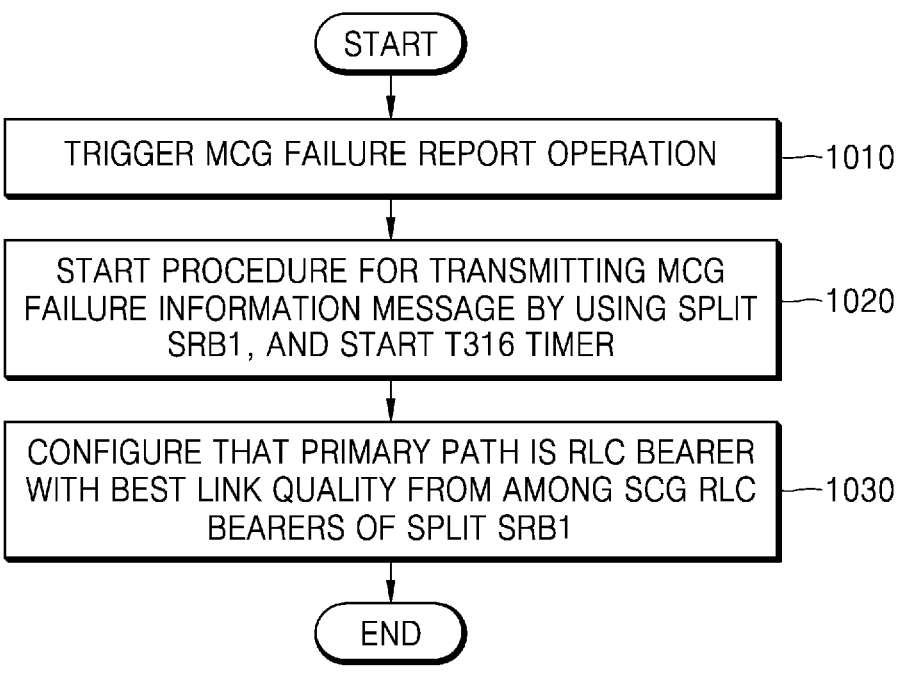
FIG. 10 is a diagram illustrating a UE operation when an MCG RLF occurs, according to an embodiment of the present disclosure.

FIG. 10 is a diagram illustrating a UE operation when an MCG RLF occurs, according to an embodiment of the present disclosure.

Referring to FIG. 10, in operation 1010, a UE may trigger an MCG failure report operation. For example, when an MCG RLF occurs, the UE in which an MCG failure report is configured may trigger the MCG failure report operation as described with reference to FIGS. 2 and 4.

In operation 1020, the UE may start a procedure for transmitting an MCG failure information message by using a split SRB1, and may start a T316 timer.

According to an embodiment, when an MCG failure report is configured in the UE, it may mean that the T316 timer that is a timer for an MCG failure report is configured.

When the split SRB1 is configured, the UE may start the procedure for transmitting the MCG failure information message by using the split SRB1. For the procedure for transmitting the MCG failure information message, the UE may suspend SRB and DRB transmission via an MCG excluding an SRB0 described in FIG. 4, and may perform a procedure for resetting an MCG MAC. The UE may start the T316 timer that is a timer for configuring an MCG failure report. The T316 timer may be stopped when an RRC reconfiguration message or the like is received from a base station. However, when the T316 timer expires, the UE may perform an RRC connection reestablishment procedure.

In operation 1030, the UE may configure that a primary path is an RLC bearer with best link quality from among SCG RLC bearers of the split SRB1. For example, when the split SRB1 is used, a primary path of the split SRB1 may be configured in advance as an RLC entity connected to the MCG. Because a threshold value for split (ul-DataSplit-Threshold) may have an infinity value or a positive value other than 0, even when the MCG failure report operation is triggered, the UE may not be able to transmit the MCG failure information message to an SCG. Accordingly, in order to prevent this problem, the UE may change the primary path to an RLC bearer (logical channel or RLC entity) with best link quality from among the SCG RLC bearers of the split SRB1.

A procedure for changing the primary path in operation 1030 may be applied only when the primary path is configured as an MCG RLC. However, the present disclosure is not limited thereto. In an embodiment, link quality of an RLC bearer may be measured by a pre-defined method. In an embodiment, link quality of an RLC bearer may be determined by a representative value from among link qualities of a cell in which the RLC bearer may be used. The representative value may be determined by a minimum value from among the link qualities of the cell in which the RLC bearer may be used. In another embodiment, the representative value may be determined by a maximum value from among the link qualities of the cell in which the RLC bearer may be used. In another embodiment, the representative value may be determined by an average value of the link qualities of the cell in which the RLC bearer may be used. In another embodiment, when a representative cell that represents the RLC bearer is defined, the representative value may be determined by link quality of the representative cell. When the primary cell is configured to be an RLC bearer with best link quality from among the SCG RLC bearers of the split SRB1 as described above, the MCG failure report operation may be performed by using a most stable RLC bearer. Accordingly, the risk of interruption or delay of data transmission and reception of the RLC bearer may be reduced while the UE performs the MCG failure report operation. A cell list in which the RLC bearer may be used may be configured by logical channel configuration included in the RRC reconfiguration message. Although operation 1020 and operation 1030 are sequentially described according to an embodiment, operation 1020 and operation 1030 may be performed in reverse order.

Figure 11:
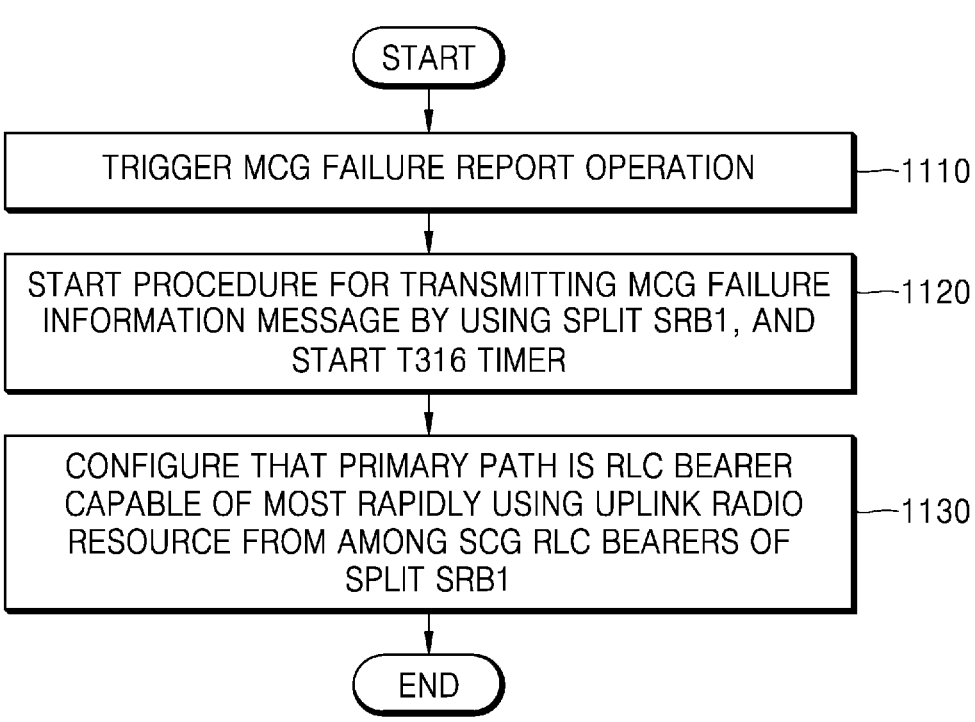
FIG. 11 is a diagram illustrating a UE operation when an MCG RLF occurs, according to an embodiment of the present disclosure.

FIG. 11 is a diagram illustrating a UE operation when an MCG RLF occurs, according to an embodiment of the present disclosure.

Referring to FIG. 11, in operation 1110, a UE may trigger an MCG failure report operation. For example, when an MCG RLF occurs, the UE in which an MCG failure report is configured may trigger the MCG failure report operation as described with reference to FIGS. 2 and 4.

In operation 1120, the UE may start a procedure for transmitting an MCG failure information message by using a split SRB1, and may start a T316 timer.

According to an embodiment, when an MCG failure report is configured in the UE, it may mean that the T316 timer that is a timer for an MCG failure report is configured. When the split SRB1 is configured, the UE may start the procedure for transmitting the MCG failure information message by using the split SRB1. For the procedure for transmitting the MCG failure information message, the UE may suspend SRB and DRB transmission via an MCG excluding an SRB0 described in FIG. 4, and may perform a procedure for resetting an MCG MAC. The UE may start the T316 timer that is a timer for an MCG failure report. The T316 timer may be stopped when an RRC reconfiguration message or the like is received from a base station. However, when the T316 timer expires, the UE may perform an RRC connection reestablishment procedure.

In operation 1130, the UE may configure that a primary path is an RLC bearer capable of most rapidly using an uplink radio resource from among SCG RLC bearers of the split SRB1. For example, when the split SRB1 is used, a primary path of the split SRB1 may be configured in advance as an RLC entity connected to the MCG. Because a threshold value for split (ul-DataSplitThreshold) may have an infinity value or a positive value other than 0, even when the MCG failure report operation is triggered, the UE may not be able to transmit the MCG failure information message to an SCG. Accordingly, in order to prevent this problem, the UE may change the primary path to an RLC bearer (logical channel or RLC entity) capable of using an uplink radio resource (uplink grant) first from among the SCG RLC bearers of the split SRB1. For example, when two SCG RLC bearers are configured in the split SRB1 and an uplink radio resource that may be used by one RLC bearer or a MAC PDU corresponding thereto is allocated, the RLC bearer may be a primary path for the MCG failure report operation.

A procedure for changing the primary path in operation 1130 may be applied only when the primary path is configured as an MCG RLC. However, the present disclosure is not limited thereto. A cell list in which the RLC bearer may be used may be configured by logical channel configuration included in the RRC reconfiguration message. When a certain uplink radio resource or a MAC PDU corresponding thereto is allocated, it may be determined which logical channel corresponding to which RLC bearer may participate in a logical channel prioritization process by using the cell list in which the RLC bearer may be used. By using the above operation, the RLC bearer capable of using a resource first may be determined. Although operation 1120 and operation 1130 are sequentially described according to an embodiment, operation 1120 and operation 1130 may be performed in reverse order.

Figure 12:
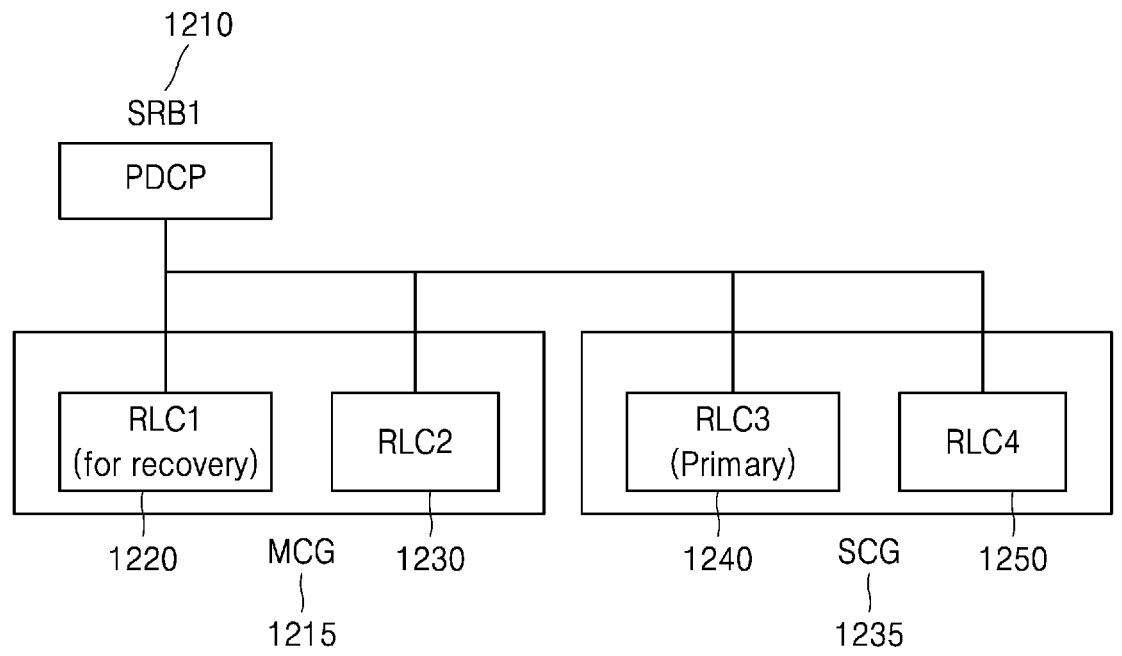
FIG. 12 is a diagram illustrating a protocol structure of a split SRB1 in which a plurality of RLC bearers are configured, according to an embodiment of the present disclosure.

FIG. 12 is a diagram illustrating a protocol structure of a split SRB1 in which a plurality of RLC bearers are configured, according to an embodiment of the present disclosure.

Referring to FIG. 12, a split SRB1 1210 may correspond to one PDCP entity, and may be configured to transmit an RRC message. For one packet data convergence protocol (PDCP) layer, a split SRB may include two or more radio link control (RLC) bearers (e.g., an RLC1 1220, an RLC2 1230, an RLC3 1240, and an RLC4 1250), and may include at least one MCG RLC bearer (e.g., the RLC1 1220 and the RLC2 1230) and at least one SCG RLC bearer (e.g., the RLC3 1240 and the RLC4 1250). In this case, the term 'RLC bearer' used herein may be interchangeably used with an RLC entity or a logical channel. An RLC bearer may correspond to an RLC entity or a logical channel in a one-to-one manner.

According to an embodiment, a cell group used in the split SRB1 1210 may include two or more cell groups. In an embodiment of FIG. 12, a DC structure may be assumed, and two cell groups, that is, a master cell group (MCG) 1215 and an SCG 1235, may be assumed. An RLC bearer configured in the MCG 1215 may be referred to as an MCG RLC bearer, and an RLC bearer configured in the SCG 1235 may be referred to as an SCG RLC bearer. Also, an RRC of the split SRB1 1210 may be located in an MN, and the MN may manage RRC connection of a UE. In this case, from among the RLC entities (e.g., the RLC1 1220, the RLC2 1230, the RLC3 1240, and the RLC4 1250) of the split SRB1 1210, the RLC3 1240 may be configured as a primary path that is always used for data transmission regardless of the amount of transmitted data. The RLC entities (e.g., the RLC1 1220, the RLC2 1230, and RLC4 1250) other than the primary RLC entity corresponding to the primary path may be used as secondary RLC entities for packet duplication transmission. According to an embodiment, packet duplication transmission may refer to a transmission method by which a PDCP entity duplicates a PDCP protocol data unit (PDU) and transmits the same PDCP PDU to another RLC bearer.

According to an embodiment, when the split SRB1 including two or more RLC entities is configured and data needs to be transmitted by using the split SRB1 due to an SCG failure, it is necessary to configure in advance an MCG RLC using which the UE should transmit an SCG failure information message. For example, in order to stably transmit the SCG failure information message, an appropriate MCG RLC may be configured in advance by the determination of a communication network. Also, in the case of an SRB in which packet duplication transmission is not configured or packet duplication transmission is not activated, an RLC bearer other than a primary path is not used for uplink packet transmission unless an SCG failure occurs. Accordingly, it may be advantageous for the base station to configure in advance an RLC bearer that may be used when an SCG failure occurs, for fast uplink resource allocation or the like. For example, in an embodiment of FIG. 12, there may be two RLC bearers (e.g., the RLC1 1220 and the RLC2 1230) that may be used as candidate RLC bearers when an SCG failure occurs and an SCG failure information message should be transmitted by using an MCG RLC of the split SRB1 1210. In this case, in an embodiment of FIG. 12, it may be assumed that the RLC1 1220 is configured as an RLC bearer that may be used when an SCG failure occurs. As such, an RLC entity that may be used when an SCG failure occurs may be an RLC bearer that is not a primary path and is configured in a cell group different from the primary path. In an embodiment of FIG. 12, the RLC1 1220 and the RLC2 1230 may be RLC bearers configured in a cell group different from the primary path. However, it may be assumed that the RLC1 1220 is an RLC bearer that may be used when an SCG failure occurs by configuration.

Figure 13:
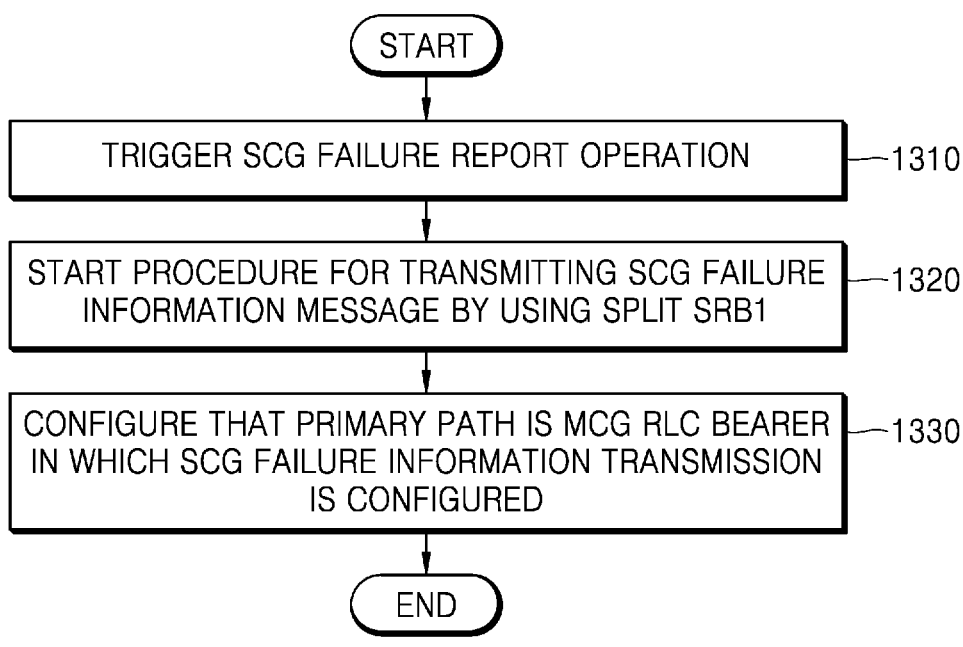
FIG. 13 is a diagram illustrating a UE operation when an SCG RLF occurs, according to an embodiment of the present disclosure.

FIG. 13 is a diagram illustrating a UE operation when an SCG RLF occurs, according to an embodiment of the present disclosure.

Referring to FIG. 13, in operation 1310, a UE may trigger an SCG failure report operation. For example, when an SCG RLF occurs, the UE may trigger the SCG failure report operation as described with reference to FIGS. 3 and 5.

In operation 1320, the UE may start a procedure for transmitting an SCG failure information message by using a split SRB1. In this case, when the split SRB is configured, the UE may start the procedure for transmitting the SCG failure information message by using the split SRB1. For the procedure for transmitting the SCG failure information message, the UE may suspend SRB and DRB transmission via an SCG described with reference to FIG. 5, and may perform a procedure for resetting an SCG MAC.

In operation 1330, the UE may configure that a primary path is an MCG RLC bearer in which SCG failure transmission is configured.

According to an embodiment, when the split SRB1 is used, a primary path of the split SRB1 may be configured in advance as an RLC entity connected to the SCG. Because a threshold value for split (ul-DataSplitThreshold) may have an infinity value or a positive value other than 0, even when the SCG failure report operation is triggered, the UE may not be able to transmit the SCG failure information message to an MCG. Accordingly, in order to prevent this problem, the primary path may be changed to a pre-configured RLC bearer (logical channel or RLC entity) for SCG failure information transmission. For example, the pre-configured RLC bearer for SCG failure information transmission may be an MCG RLC bearer. Accordingly, the UE may transmit data to the RLC entity connected to the MCG. According to an embodiment, a procedure for changing the primary path in operation 1330 may be applied only when the primary path is configured as an SCG RLC. However, the present disclosure is not limited thereto.

According to an embodiment, the RLC bearer for SCG failure information transmission may be a split secondary RLC bearer that may be used during split bearer fallback. Otherwise, a separate RLC bearer for SCG failure information transmission may be transmitted by an RRC reconfiguration message. A base station may include stable cells for connection with the UE in a cell list in which the RLC bearer for SCG failure information transmission may be used, to reduce the risk of interruption or delay of data transmission and reception of the RLC bearer while the SCG failure report operation is performed. Although operation 1320 and operation 1330 are sequentially described according to an embodiment, operation 1320 and operation 1330 may be performed in reverse order.

Figure 14:
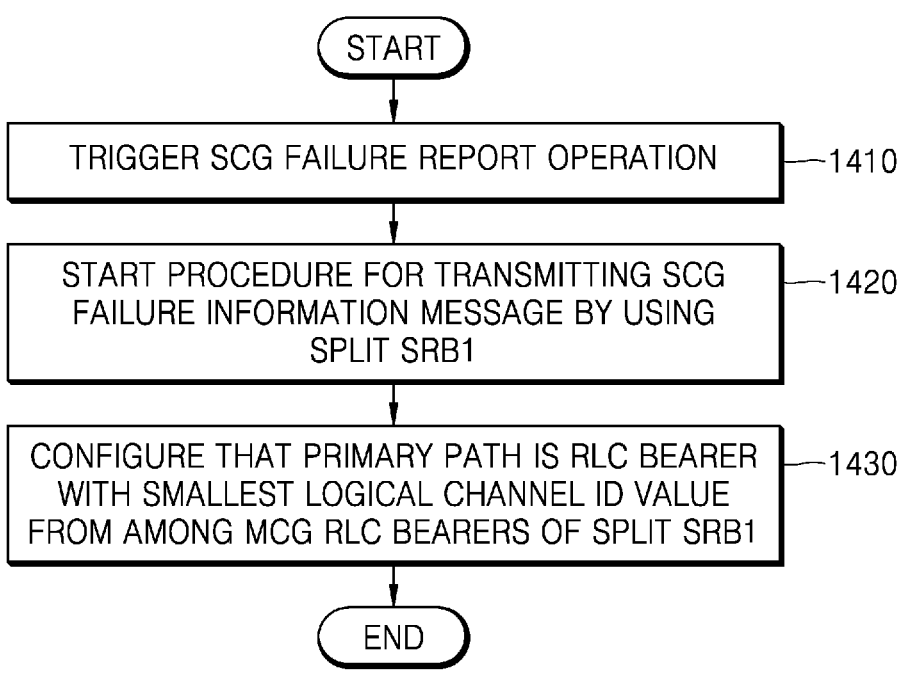
FIG. 14 is a diagram illustrating a UE operation when an SCG RLC occurs, according to an embodiment of the present disclosure.

FIG. 14 is a diagram illustrating a UE operation when an SCG RLF occurs, according to an embodiment of the present disclosure.

Referring to FIG. 14, in operation 1410, a UE may trigger an SCG failure report operation. For example, when an SCG RLF occurs, the UE may trigger the SCG failure report operation as described with reference to FIGS. 3 and 5.

In operation 1420, the UE may start a procedure for transmitting an SCG failure information message by using a split SRB1. In this case, when the split SRB1 is configured, the UE may start the procedure for transmitting the SCG failure information message by using the split SRB1. For the procedure for transmitting the SCG failure information message, the UE may suspend SRB and DRB transmission via an SCG described in FIG. 5, and may perform a procedure for resetting an SCG MAC.

In operation 1430, the UE may configure that a primary path is an RLC bearer with a smallest LCID value from among MCG bearers of the split SRB1.

According to an embodiment, when the split SRB1 is used, a primary path of the split SRB1 may be configured in advance as an RLC entity connected to the SCG. Because a threshold value for split (ul-DataSplitThreshold) may have an infinity value or a positive value other than 0, even when the SCG failure report operation is triggered, the UE may not be able to transmit the SCG failure information message to an MCG. Accordingly, in order to prevent this problem, the primary path may be changed to an RLC bearer (logical channel or RLC entity) with a smallest logical channel identifier (LCID) value from among MCG RLC bearers of the split SRB1.

A procedure for changing the primary path in operation 1430 may be applied only when the primary path is configured as an SCG RLC. However, the present disclosure is not limited thereto. Through the primary change as described above, the UE may transmit data to the RLC entity connected to the MCG. Also, when a base station receives uplink data from the RLC bearer with the smallest LCID value from among the MCG RLC bearers, the base station may recognize that the SCG failure information message is a message generated by the SCG failure report operation. The base station may include stable cells for connection with the UE in a cell list in which the RLC bearer with the smallest LCID value may be used from among the MCG RLC bearers for SCG failure information transmission. Accordingly, the risk of interruption or delay of data transmission and reception of the RLC bearer may be reduced while the UE performs the SCG failure report operation. Although operation 1420 and operation 1430 are sequentially described according to an embodiment, operation 1420 and operation 1430 may be performed in reverse order.

Figure 15:
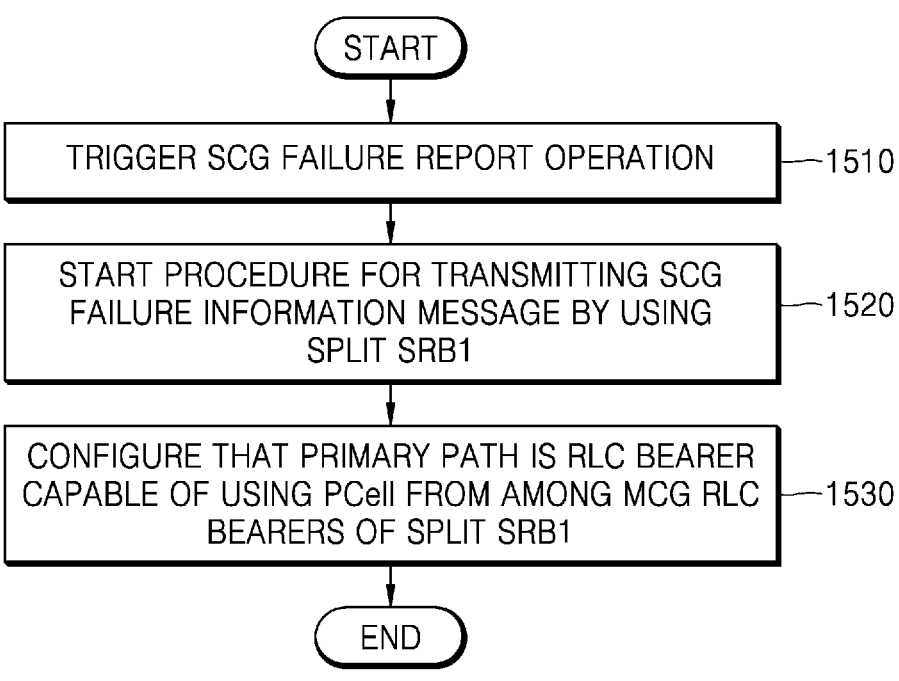
FIG. 15 is a diagram illustrating a UE operation when an SCG RLC occurs, according to an embodiment of the present disclosure.

FIG. 15 is a diagram illustrating a UE operation when an SCG RLF occurs, according to an embodiment of the present disclosure.

Referring to FIG. 15, in operation 1510, a UE may trigger an SCG failure report operation. For example, when an SCG RLF occurs, the UE may trigger the SCG failure report operation as described with reference to FIGS. 3 and 5.

In operation 1520, the UE may start a procedure for transmitting an SCG failure information message by using a split SRB1. In this case, when the split SRB1 is configured, the UE may start the procedure for transmitting the SCG failure information message by using the split SRB1. For the procedure for transmitting the SCG failure information message, the UE may suspend SRB and DRB transmission via an SCG described in FIG. 5, and may perform a procedure for resetting an SCG MAC.

In operation 1530, the UE may configure that a primary path is an RLC bearer capable of using a PCell from among MCG bearers of the split SRB1.

According to an embodiment, when the split SRB1 is used, a primary path of the split SRB1 may be configured in advance as an RLC entity connected to the SCG. Because a threshold value for split (ul-DataSplitThreshold) may have an infinity value or a positive value other than 0, even when the SCG failure report operation is triggered, the UE may not be able to transmit the SCG failure information message to an MCG. Accordingly, in order to prevent this problem, the primary path may be changed to an RLC bearer (logical channel or RLC entity) capable of using a primary cell (PCell) from among MCG RLC bearers of the split SRB1.

A procedure for changing the primary path in operation 1530 may be applied only when the primary path is configured as an SCG RLC. However, the present disclosure is not limited thereto. In an embodiment, because the PCell is a cell that may have a most stable connection state from among connected cells, the risk of interruption or delay of data transmission and reception of the RLC bearer may be reduced while the UE performs the SCG failure report operation. A cell list in which the RLC bearer may be used may be configured by logical channel configuration included in an RRC reconfiguration message. Accordingly, the UE may transmit data to the RLC entity connected to the MCG. Also, when a base station receives uplink data from the RLC bearer capable of using the PCell from among the MCG RLC bearers, the base station may recognize that the SCG failure information message is a message generated by the SCG failure report operation. Although operation 1520 and operation 1530 are sequentially described according to an embodiment, operation 1520 and operation 1530 may be performed in reverse order.

Figure 16:
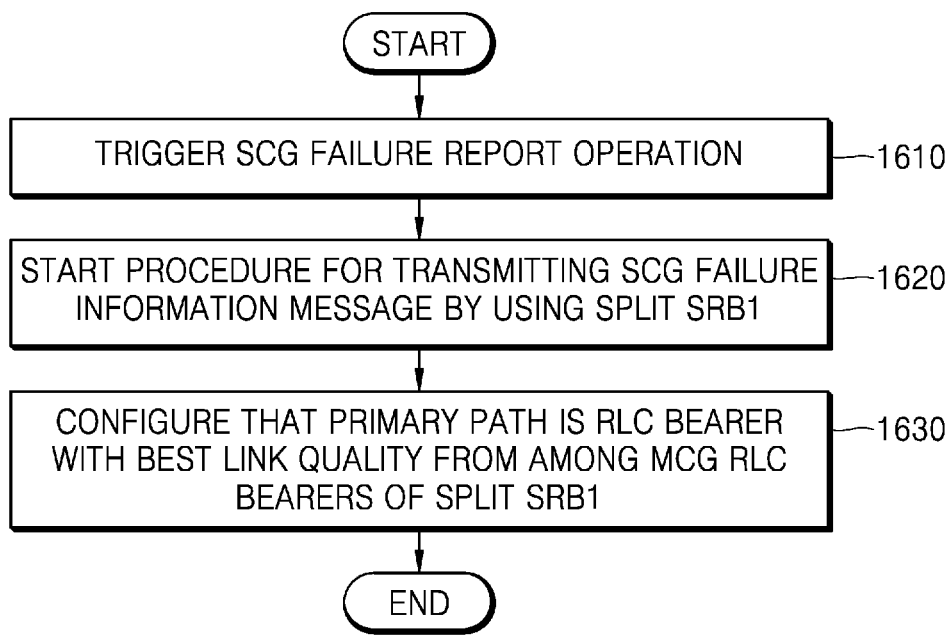
FIG. 16 is a diagram illustrating a UE operation when an SCG RLC occurs, according to an embodiment of the present disclosure.

FIG. 16 is a diagram illustrating a UE operation when an SCG RLF occurs, according to an embodiment of the present disclosure.

Referring to FIG. 16, in operation 1610, a UE may trigger an SCG failure report operation. For example, when an SCG RLF occurs, the UE may trigger the SCG failure report operation as described with reference to FIGS. 3 and 5.

In operation 1620, the UE may start a procedure for transmitting an SCG failure information message by using a split SRB1. In this case, when the split SRB1 is configured, the UE may start the procedure for transmitting the SCG failure information message by using the split SRB1. For the procedure for transmitting the SCG failure information message, the UE may suspend SRB and DRB transmission via an SCG described in FIG. 5, and may perform a procedure for resetting an SCG MAC.

In operation 1630, the UE may configure that a primary path is an RLC bearer with best link quality from among MCG RLC bearers of the split SRB1.

In an embodiment, when the split SRB1 is used, a primary path of the split SRB1 may be configured in advance as an RLC entity connected to the SCG. Because a threshold value for split (ul-DataSplitThreshold) may have an infinity value or a positive value other than 0, even when the SCG failure report operation is triggered, the UE may not be able to transmit the SCG failure information message to an MCG. Accordingly, in order to prevent this problem, the primary path may be changed to an RLC bearer (logical channel or RLC entity) with best link quality from among the MCG RLC bearers of the split SRB1.

A procedure for changing the primary path in operation 1630 may be applied only when the primary path is configured as an SCG RLC. However, the present disclosure is not limited thereto. In an embodiment, link quality of an RLC bearer may be measured by a pre-defined method. In an embodiment, link quality of an RLC bearer may be determined by a representative value from among link qualities of a cell in which the RLC bearer may be used. The representative value may be determined by a minimum value from among the link qualities of the cell in which the RLC bearer may be used. In another embodiment, the representative value may be determined by a maximum value from among the link qualities of the cell in which the RLC bearer may be used. In another embodiment, the representative value may be determined by an average value of the link qualities of the cell in which the RLC bearer may be used. In another embodiment, when a representative cell that represents the RLC bearer is defined, the representative value may be determined by link quality of the representative cell. When the primary path is configured to be an RLC bearer with best link quality from among the MCG RLC bearers of the split SRB1 as described above, the SCG failure report operation may be performed by using a most stable RLC bearer. Accordingly, the risk of interruption or delay of data transmission and reception of the RLC bearer may be reduced while the UE performs the SCG failure report operation. A cell list in which the RLC bearer may be used may be determined by logical channel configuration included in an RRC reconfiguration message. Although operation 1620 and operation 1630 are sequentially described according to an embodiment, operation 1620 and operation 1630 may be performed in reverse order.

Figure 17:
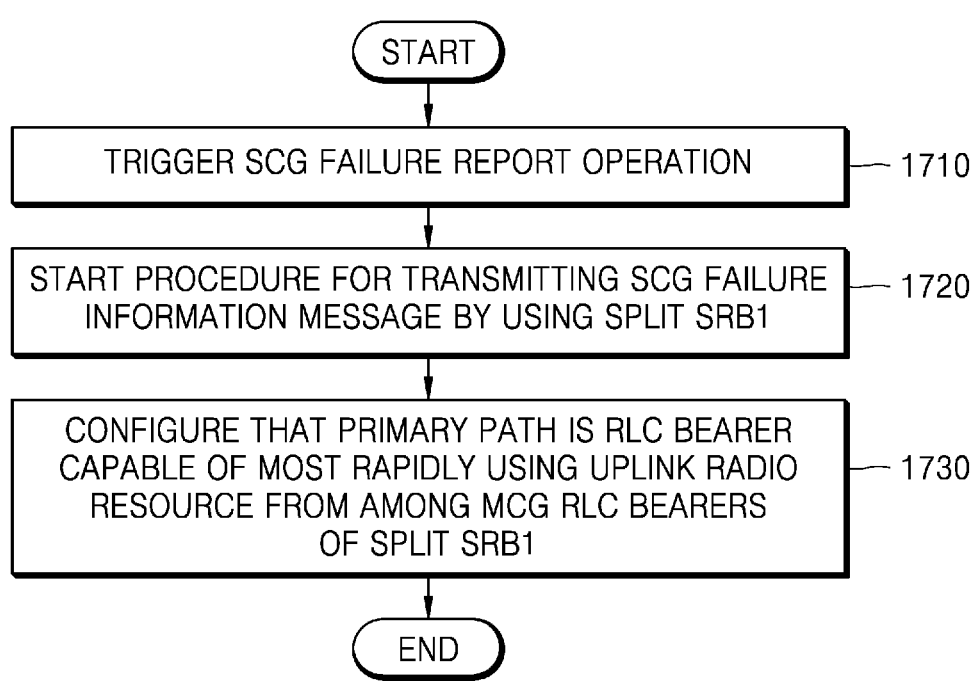
FIG. 17 is a diagram illustrating a UE operation when an SCG RLC occurs, according to an embodiment of the present disclosure.

FIG. 17 is a diagram illustrating a UE operation when an SCG RLF occurs, according to an embodiment of the present disclosure.

Referring to FIG. 17, in operation 1710, a UE may trigger an SCG failure report operation. For example, when an SCG RLF occurs, the UE may trigger the SCG failure report operation as described with reference to FIGS. 3 and 5.

In operation 1720, the UE may start a procedure for transmitting an SCG failure information message by using a split SRB1. In this case, when the split SRB1 is configured, the UE may start the procedure for transmitting the SCG failure information message by using the split SRB1. For the procedure for transmitting the SCG failure information message, the UE may suspend SRB and DRB transmission via an SCG described in FIG. 5, and may perform a procedure for resetting an SCG MAC.

In operation 1730, the UE may configure that a primary path is an RLC bearer capable of most rapidly using an uplink radio resource from among MCG RLC bearers of the split SRB1.

In an embodiment, when the split SRB1 is used, a primary path of the split SRB1 may be configured in advance as an RLC entity connected to the SCG. Because a threshold value for split (ul-DataSplitThreshold) may have an infinity value or a positive value other than 0, even when the SCG failure report operation is triggered, the UE may not be able to transmit the SCG failure information message to an MCG. Accordingly, in order to prevent this problem, the primary path may be changed to an RLC bearer (logical channel or RLC entity) capable of using an uplink radio resource (uplink grant) first from among the MCG RLC bearers of the split SRB1. For example, when two MCG RLC bearers are configured in the split SRB1 and an uplink radio resource that may be used by one RLC bearer or a MAC PDU corresponding thereto is allocated, the RLC bearer may be a primary path for the SCG failure report operation.

A procedure for changing the primary path in operation 1730 may be applied only when the primary path is configured as an SCG RLC. However, the present disclosure is not limited thereto. A list cell in which the RLC bearer may be used may be configured by logical channel configuration included in an RRC reconfiguration message. When a certain uplink radio resource or a MAC PDU corresponding thereto is allocated, it may be determined which logical channel corresponding to which RLC bearer may participate in a logical channel prioritization process by using the cell list in which the RLC bearer may be used. By using the above operation, the RLC bearer capable of using a resource first may be determined. Although operation 1720 and operation 1730 are sequentially described according to an embodiment, operation 1720 and operation 1730 may be performed in reverse order.

Figure 18:
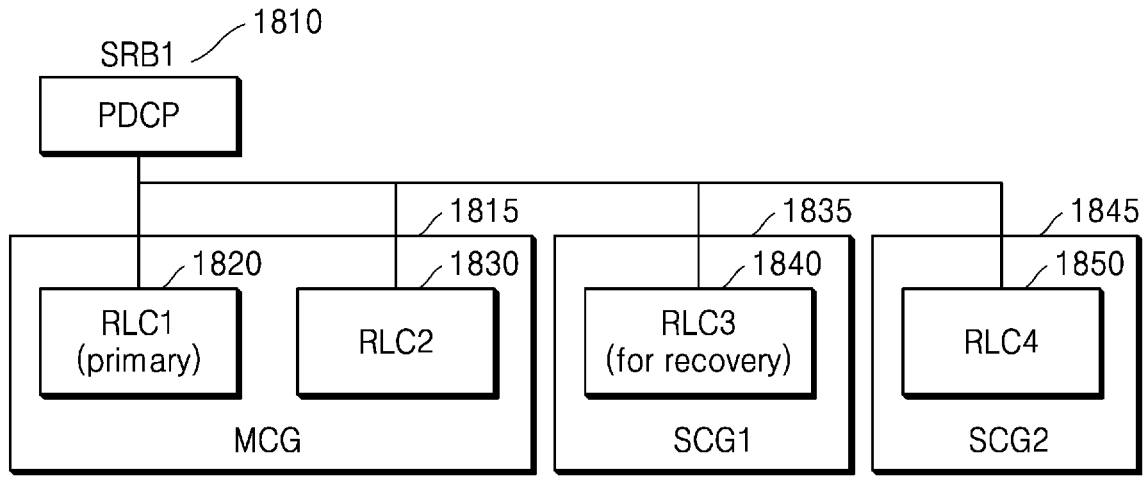
FIG. 18 is a diagram illustrating a protocol structure of a split SRB1 in which a plurality of RLC bearers are configured, according to an embodiment of the present disclosure.

FIG. 18 is a diagram illustrating a protocol structure of a split SRB1 in which a plurality of radio link control (RLC) bearers are configured, according to an embodiment of the present disclosure.

Referring to FIG. 18, a split SRB1 1810 may correspond to one PDCP entity, and may be configured to transmit an RRC message. For one packet data convergence protocol (PDCP) layer, a split SRB may include two or more radio link control (RLC) bearers (e.g., an RLC1 1820, an RLC2 1830, an RLC3 1840, and an RLC4 1850), and may include at least one MCG RLC bearer (e.g., the RLC1 1820 and the RLC2 1830) and at least one SCG RLC bearer (e.g., the RLC3 1840 and the RLC4 1850). When two or more secondary cell groups (SCGs) are connected to a UE, an RLC entity belonging to an SCG may be an SCG RLC bearer configured in each different SCG. In other words, a cell group to which the RLC3 belongs and a cell group to which the RLC4 belongs may be different from each other. In this case, the term 'RLC bearer' used herein may be interchangeably used with an RLC entity or a logical channel. An RLC bearer may correspond to an RLC entity or a logical channel in a one-to-one manner.

According to an embodiment, a cell group used in the split SRB1 1810 may include two or more cell groups. In an embodiment of FIG. 18, a three cell group multi-connectivity structure may be assumed, and one master cell group (MCG) 1815 and two secondary cell groups (SCGs) 1835 and 1845 may be assumed. An RLC bearer configured in the MCG 1815 may be referred to as an MCG RLC bearer, and an RLC bearer configured in each of the SCGs 1835 and 1846 may be referred to as an SCG RLC bearer. Also, an RRC of the split SRB1 1810 may be located in an MN, and the MN may mange RRC connection of the UE. In this case, from among the RLC entities (e.g., the RLC1 1820, the RLC2 1830, the RLC3 1840, and the RLC4 1850) of the split SRB1 1810, the RLC1 1820 may be configured as a primary path that is always used for data transmission regardless of the amount of transmitted data. The RLC entities (e.g., the RLC2 1830, the RLC3 1840, and the RLC4 1850) other than the primary RLC entity corresponding to the primary path may be used as secondary RLC entities for packet duplication transmission. According to an embodiment, packet duplication transmission may refer to a transmission method by which a PDCP entity duplicates a PDCP protocol data unit (PDU) and transmits the same PDCP PDU to another RLC bearer.

According to an embodiment, when the split SRB1 including two or more RLC entities is configured and data needs to be transmitted by using the split SRB1 due to an MCG failure, it is necessary to configure in advance an SCG RLC using which the UE should transmit an MCG failure information message. For example, in order to stably transmit the MCG failure information message, an appropriate SCG RLC may be configured in advance by the determination of a communication network. Also, in the case of an SRB in which packet duplication transmission is not configured or packet duplication transmission is not activated, an RLC bearer other than a primary path is not used for uplink packet transmission unless an MCG failure occurs. Accordingly, it may be advantages for a base station to configure in advance an RLC bearer that may be used when an MCG failure occurs, for fast uplink resource allocation or the like. For example, in an embodiment of FIG. 18, there may be two RLC bearers (e.g., the RLC3 1840 and the RLC4 1850) that may be used as candidate RLC bearers when an MCG failure occurs and an MCG failure information message should be transmitted by using an SCG RLC of the split SRB1 1810. In this case, in an embodiment of FIG. 18, it may be assumed that the RLC3 1840 is configured as an RLC bearer that may be used when an MCG failure occurs. As such, an RLC entity that may be used when an MCG failure occurs may be an RLC bearer that is not a primary path and is configured in a cell group different from the primary path. In an embodiment of FIG. 18, the RLC3 1840 and the RLC4 1850 may be RLC bearers configured in a cell group different from the primary path. However, it may be assumed that the RLC3 1840 is an RLC bearer that may be used when an MCG failure occurs by configuration.

In order to configure an RLC bearer that may be used when an MCG failure occurs, the base station may configure a cell group ID and an LCID of a corresponding RLC entity in the UE. However, without this configuration, the UE may configure an RLC bearer that may be used when an MCG failure occurs by using a pre-defined method. For example, the UE may select an RLC bearer with a lowest LCID value of a cell group with a lowest cell group ID value (or SCG ID value) from among the SCGs. In another embodiment, the UE may select an RLC bearer that may use a PS cell (PScell) from among the SCGs.

Figure 19:
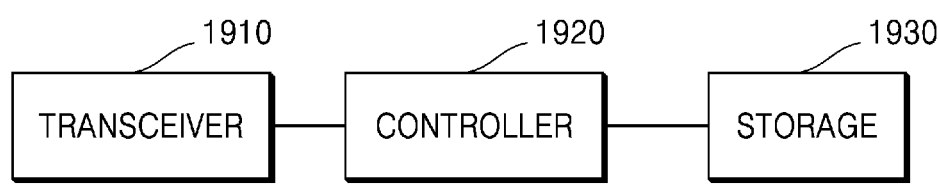
FIG. 19 is a diagram illustrating a structure of a base station, according to an embodiment of the present disclosure.

FIG. 19 is a diagram illustrating a structure of a base station, according to an embodiment of the present disclosure.

As shown in FIG. 19, a base station of the present disclosure may include a transceiver 1910, a controller 1920, and a storage 1930. However, elements of the base station are not limited thereto. For example, the base station may include more or fewer elements than those illustrated in FIG. 19. In addition, the transceiver 1910, the controller 1920, and the storage 1930 may be implemented as a single chip.

Referring to FIG. 19, the base station may include the transceiver 1910, the controller 1920, and the storage 1930. In the present disclosure, the controller 1920 may be defined as a circuit, an application-specific integrated circuit, or at least one processor.

According to an embodiment, the transceiver 1910 may transmit and receive a signal to and from another network entity. For example, the transceiver 1910 may transmit system information to a terminal and may transmit a synchronization signal or a reference signal.

The transceiver 1910 may transmit and receive a signal to and from the terminal. The signal transmitted/received to/from the terminal may include control information and data. The transceiver 1910 may include a radio frequency (RF) transmitter for up-converting and amplifying a frequency of a transmitted signal and an RF receiver for low-noise amplifying a received signal and down-converting a frequency of the received signal. However, this is merely an example of the transceiver 1910, and thus, elements of the transceiver 1910 are not limited to the RF transmitter and the RF receiver. Also, the transceiver 1910 may receive a signal through a wireless channel and output the signal to the controller 1920, and may transmit a signal output from the controller 1920 through a wireless channel.

According to an embodiment, the controller 1920 may control overall operations of the base station according to an embodiment of the present disclosure. For example, the controller 1920 may control a signal flow between blocks to perform an operation according to flowcharts described above. Also, the controller 1920 may control elements of the base station to perform a fast MCG recovery method for an RLC entity according to an embodiment of the present disclosure. A plurality of controllers 1920 may be provided, and the controller 1920 may perform a fast MCG recovery operation for an RLC entity of the present disclosure described above by executing a program stored in the storage 1930.

According to an embodiment, the storage 1930 may store at least one of information transmitted and received through the transceiver 1910 and information generated by the controller 1920. Also, the storage 1930 may store control information or data included in a signal transmitted and received by the base station. The storage 1930 may include a storage medium, such as read-only memory (ROM), random-access memory (RAM), a hard disk, compact disc-ROM (CD- ROM), or digital versatile disc (DVD), or a combination thereof. Also, a plurality of storages 1930 may be provided. According to an embodiment, the storage 1930 may store a program for performing a fast MCG recovery operation for an RLC entity according to embodiments of the present disclosure.

Figure 20:
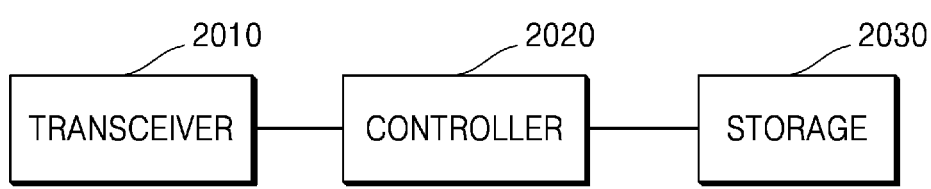
FIG. 20 is a diagram illustrating a structure of a terminal, according to an embodiment of the present disclosure.

FIG. 20 is a diagram illustrating a structure of a terminal, according to an embodiment of the present disclosure.

As shown in FIG. 20, a terminal of the present disclosure may include a transceiver 2010, a controller 2020, and a storage 2030. However, elements of the terminal are not limited thereto. For example, the terminal may include more or fewer elements than those illustrated in FIG. 20. In addition, the transceiver 2010, the controller 2020, and the storage 2030 may be implemented as a single chip.

Referring to FIG. 20, the terminal may include the transceiver 2010, the controller 2020, and the storage 2030. In the present disclosure, the controller 2020 may be defined as a circuit, an application-specific integrated circuit, or at least one processor.

According to an embodiment, the transceiver 2010 may transmit and receive a signal to and from another network entity. For example, the transceiver 2010 may receive system information from a base station and may receive a synchronization signal or a reference signal.

The transceiver 2010 may transmit and receive a signal to and from the base station. The signal transmitted and received to and from the base station may include control information and data. The transceiver 2010 may include an RF transmitter for up-converting and amplifying a frequency of a transmitted signal and an RF receiver for low-noise amplifying a received signal and down-converting a frequency of the received signal. However, this is merely an example of the transceiver 2010, and thus, elements of the transceiver 2010 are not limited to the RF transmitter and the RF receiver. Also, the transceiver 2010 may receive a signal through a wireless channel and output the signal to the controller 2020, and may transmit a signal output from the controller 2020 through a wireless channel.

According to an embodiment, the controller 2020 may control overall operations of the terminal according to an embodiment of the present disclosure. For example, the controller 2020 may control a signal flow between blocks to perform an operation according to flowcharts described above. Also, the controller 2020 may control elements of the terminal to perform a fast MCG recovery method for an RLC entity according to an embodiment of the present disclosure. A plurality of controllers 2020 may be provided, and the controller 2020 may perform a fast MCG recovery operation for an RLC entity of the present disclosure described above by executing a program stored in the storage 2030.

According to an embodiment, the storage 2030 may store at least one of information transmitted and received through the transceiver 2010 and information generated by the controller 2020.

Also, the storage 2030 may store a program and data required for an operation of the terminal. Also, the storage 2030 may store control information or data included in a signal transmitted and received by the terminal. The storage 1130 may include a storage medium, such as ROM, RAM, a hard disk, CD-ROM, or digital versatile disc (DVD), or a combination thereof. Also, a plurality of storages 2030 may be provided. According to an embodiment, the storage 2030 may store a program for performing a fast MCG recovery operation for an RLC entity according to embodiments of the present disclosure.

According to an embodiment of the present disclosure, an operating method of a terminal that is able to communicate with a master node and a secondary node in a wireless communication system includes detecting a master cell group (MCG) failure related to the master node, in response to the detection of the MCG failure, changing a primary path of a split signaling radio bearer 1 (SRB1) from a radio link control (RLC) bearer of an MCG related to the master node to one RLC bearer from among a plurality of RLC bearers of a secondary cell group (SCG) related to the secondary node, based on a pre-determined criterion, and transmitting a message related to the MCG failure to the master node, by using the RLC bearer of the SCG changed as the primary path.

According to an embodiment, the changing of the primary path of the split SRB1 from the RLC bearer of the MCG related to the master node to the one RLC bearer from among the plurality of RLC bearers of the SCG related to the secondary node based on the pre-determined criterion may include changing the primary path of the split SRB1 from the RLC bearer of the MCG to a pre-configured RLC bearer from among the plurality of RLC bearers of the SCG.

According to an embodiment, the changing of the primary path of the split SRB1 from the RLC bearer of the MCG related to the master node to the one RLC bearer from among the plurality of RLC bearers of the SCG related to the secondary node based on the pre-determined criterion may include changing the primary path of the split SRB1 from the RLC bearer of the MCG to an RLC bearer with a smallest logical channel identifier (LCID) value from among the plurality of RLC bearers of the SCG.

According to an embodiment, the changing of the primary path of the split SRB1 from the RLC bearer of the MCG related to the master node to the one RLC bearer from among the plurality of RLC bearers of the SCG related to the secondary node based on the pre-determined criterion may include changing the primary path of the split SRB1 from the RLC bearer of the MCG to an RLC bearer using a primary SCG cell (PSCell) from among the plurality of RLC bearers of the SCG.

According to an embodiment, the changing of the primary path of the split SRB1 from the RLC bearer of the MCG related to the master node to the one RLC bearer from among the plurality of RLC bearers of the SCG related to the secondary node based on the pre-determined criterion may include, based on link quality, changing the primary path of the split SRB1 from the RLC bearer of the MCG to one RLC bearer from among the plurality of RLC bearers of the SCG.

According to an embodiment, the changing of the primary path of the split SRB1 from the RLC bearer of the MCG related to the master node to the one RLC bearer from among the plurality of RLC bearers of the SCG related to the secondary node based on the pre-determined criterion may include changing the primary path of the split SRB1 from the RLC bearer of the MCG to an RLC bearer that most rapidly uses an uplink radio resource from among the plurality of RLC bearers of the SCG.

According to an embodiment, the changing of the primary path of the split SRB1 from the RLC bearer of the MCG related to the master node to the one RLC bearer from among the plurality of RLC bearers of the SCG related to the secondary node based on the pre-determined criterion may include identifying an SCG with a smallest cell identifier value from among a plurality of SCGs related to the secondary node, and changing the primary path of the split SRB1 from the RLC bearer of the MCG to an RLC bearer with a smallest logical channel identifier (LCID) value from among at least one RLC bearer of the identified SCG.

According to an embodiment of the present disclosure, an operating method of a terminal that is able to communicate with a master node and a secondary node in a wireless communication method includes detecting a secondary cell group (SCG) failure related to the secondary node, in response to the detection of the SCG failure, changing a primary path of a split signaling radio bearer 1 (SRB1) from a radio link control (RLC) bearer of an SCG related to the secondary node to one RLC bearer from among a plurality of RLC bearers of a master cell group (MCG) related to the mater node, based on a pre-determined criterion, and transmitting a message related to the SCG failure to the master node, by using at least one RLC bearer of the MCG changed as the primary path.

According to an embodiment of the present disclosure, a terminal that is able to communicate with a master node and a secondary node in a wireless communication system includes a transceiver, and at least one processor configured to detect a master cell group (MCG) failure related to the master node, in response to the detection of the MCG failure, change a primary path of a split signaling radio bearer 1 (SRB1) from a radio link control (RLC) bearer of an MCG related to the master node to one RLC bearer from among a plurality of RLC bearers of a secondary cell group (SCG) related to the secondary node, based on a pre-determined criterion, and transmit a message related to the MCG failure to the master node through the transceiver, by using the RLC bearer of the SCG changed as the primary path.

According to an embodiment, the at least one processor may be further configured to change the primary path of the split SRB1 from the RLC bearer of the MCG to a pre-configured RLC bearer from among the plurality of RLC bearers of the SCG.

According to an embodiment, the at least one processor may be further configured to change the primary path of the split SRB1 from the RLC bearer of the MCG to an RLC bearer with a smallest logical channel identifier (LCID) value from among the plurality of RLC bearers of the SCG.

According to an embodiment, the at least one processor may be further configured to change the primary path of the split SRB1 from the RLC bearer of the MCG to an RLC bearer using a primary SCG cell (PSCell) from among the plurality of RLC bearers of the SCG.

According to an embodiment, the at least one processor may be further configured to, based on link quality, change the primary path of the split SRB1 from the RLC bearer of the MCG to one RLC bearer from among the plurality of RLC bearers of the SCG.

According to an embodiment, the at least one processor may be further configured to change the primary path of the split SRB1 from the RLC bearer of the MCG to an RLC bearer that most rapidly uses an uplink radio resource from among the plurality of RLC bearers of the SCG.

According to an embodiment, the at least one processor may be further configured to identify an SCG with a smallest cell identifier value from among a plurality of SCGs related to the secondary node, and change the primary path of the split SRB1 from the RLC bearer of the MCG to an RLC bearer with a smallest logical channel identifier (LCID) value from among at least one RLC bearer of the identified SCG.

Methods according to the embodiments of the present disclosure as described in the detailed description or in the following claims may be implemented by hardware, software, or a combination of hardware and software.

When the methods are implemented by software, a computer-readable storage medium or a computer program product storing one or more programs (software modules) may be provided. The one or more programs that are stored in the computer-readable storage medium or the computer program product are configured to be executable by one or more processors in an electronic device. The one or more programs include instructions for allowing the electronic device to execute the methods according to the claims or the embodiments of the present disclosure.

The programs (e.g., software modules or software) may be stored in a random-access memory (RAM), a non-volatile memory including a flash memory, a read-only memory (ROM), an electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in a memory including any combination of some or all of the above storage media. Also, a plurality of constituent memories may be provided.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may access, via an external port, an apparatus for performing embodiments of the present disclosure. Furthermore, an additional storage device on the communication network may access the apparatus for performing embodiments of the present disclosure.

In the present disclosure, the term "computer program product" or "computer-readable recording medium" is used to totally indicate a memory, a hard disk mounted in a hard disk drive, and a medium such as a signal. The "computer program product" or "computer-readable recording medium" is a means provided to a method of performing a fast MCG recovery operation for an RLC entity according to the present disclosure.

In the afore-described embodiments of the present disclosure, elements included in the present disclosure are expressed in a singular or plural form according to the embodiments of the present disclosure. However, the singular or plural form is selected appropriately for a condition provided for convenience of explanation, and the present disclosure is not limited to the singular or plural form. An element expressed in a singular form may include a plurality of elements and elements expressed in a plural form may include a single element.

It should be understood that the embodiments of the present disclosure described herein should be considered in a descriptive sense only and not for purposes of limitation. Thus, it will be apparent to one of ordinary skill in the art that the present disclosure is not limited to the embodiments of the present disclosure, which have been provided only for illustrative purposes. Also, the embodiments may be combined with each other as required. For example, portions of an embodiment and another embodiment of the present disclosure may be combined with each other and a base station and a terminal may be used. Also, the embodiments of the present disclosure may be applied to other communication systems, and other modifications may be made therein based on the spirit of the above embodiments. For example, the embodiments of the present disclosure may be applied to a long term evolution (LTE), 5th generation (5G), or new radio (NR) system.

Particular embodiments of the present disclosure have been described in the detailed descriptions of the present disclosure, but it will be understood that various modifications may be made without departing the scope of the present disclosure. Hence, the scope of the present disclosure is not limited to the above embodiments of the present disclosure, and may be defined by not only the following claims but also equivalents thereof.

The invention claimed is:

1. A method performed by a terminal capable of communicating with a master node and a secondary node in a wireless communication system, the method comprising:
   detecting a master cell group (MCG) failure related to the master node;
   initiating an MCG failure reporting procedure based on the detection of the MCG failure;
   starting a timer for the MCG failure reporting procedure;
   switching a primary path of a split signaling radio bearer 1 (SRB1) from a radio link control (RLC) bearer of the MCG to an RLC bearer capable of using a primary secondary cell (PSCell), among a plurality of RLC bearers of a secondary cell group (SCG); and
   transmitting, to the master node, a message related to the MCG failure via the RLC bearer capable of using the PSCell,
   wherein a list of cells available for the RLC bearer is configured by logical channel configuration included in an RRC reconfiguration message.

2. The method of claim 1, wherein the RLC bearer capable of using the PSCell is an RLC bearer with a smallest logical channel identifier (LCID) value among the plurality of RLC bearers of the SCG.

3. The method of claim 1, wherein the RLC bearer capable of using the PSCell is an RLC bearer that most rapidly uses an uplink radio resource among the plurality of RLC bearers of the SCG.

4. The method of claim 1, further comprising:
   identifying an SCG with a smallest cell identifier value among a plurality of SCGs related to the secondary node; and
   wherein the RLC bearer capable of using the PSCell is an RLC bearer with a smallest logical channel identifier (LCID) value among at least one RLC bearer of the identified SCG.

5. The method of claim 1, further comprising:
   transmitting an SCG failure information message when an SCG failure occurs.

6. A method performed by a terminal capable of communicating with a master node and a secondary node in a wireless communication method, the method comprising:
   detecting a secondary cell group (SCG) failure related to the secondary node;
   initiating an SCG failure reporting procedure based on the detection of the SCG failure;
   switching a primary path of a split signaling radio bearer 1 (SRB1) from a radio link control (RLC) bearer of the SCG to an RLC bearer capable of using a primary cell (PCell), among a plurality of RLC bearers of a master cell group (MCG); and
   transmitting, to the master node a message related to the SCG failure via the RLC bearer capable of using the PCell,
   wherein a list of cells available for the RLC bearer is configured by logical channel configuration included in an RRC reconfiguration message.

7. A terminal capable of communicating with a master node and a secondary node in a wireless communication system, the terminal comprising:

a transceiver;

memory, comprising one or more storage media, storing instructions; and at least one processor communicatively coupled to the transceiver and the memory, wherein the instructions, when executed by the one or more processors individually or collectively, cause the terminal to:

detect a master cell group (MCG) failure related to the master node, initiate an MCG failure reporting procedure based on the detection of the MCG failure, start a timer for the MCG failure reporting procedure, switch a primary path of a split signaling radio bearer 1 (SRB1) from a radio link control (RLC) bearer of the MCG to an RLC bearer capable of using a primary secondary cell (PSCell), among a plurality of RLC bearers of a secondary cell group (SCG), and transmit through the transceiver, to the master node, a message related to the MCG failure via the RLC bearer capable of using the PSCell, and wherein a list of cells available for the RLC bearer is configured by logical channel configuration included in an RRC reconfiguration message.

8. The terminal of claim 7, wherein the RLC bearer capable of using the PSCell is an RLC bearer with a smallest logical channel identifier (LCID) value among the plurality of RLC bearers of the SCG.

9. The terminal of claim 7, wherein the RLC bearer capable of using the PSCell is an RLC bearer that most rapidly uses an uplink radio resource among the plurality of RLC bearers of the SCG.

10. The terminal of claim 7, wherein the instructions that, when executed by the at least one processor individually or collectively, further cause the terminal to:

identify an SCG with a smallest cell identifier value among a plurality of SCGs related to the secondary node; and wherein the RLC bearer capable of using the PSCell is an RLC bearer with a smallest logical channel identifier (LCID) value among at least one RLC bearer of the identified SCG.

* * * * *